US008918114B2

(12) United States Patent
Gupta et al.

(10) Patent No.: US 8,918,114 B2
(45) Date of Patent: Dec. 23, 2014

(54) USING RESOURCE UTILIZATION MESSAGES IN A MULTI-CARRIER MAC TO ACHIEVE FAIRNESS

(75) Inventors: Rajarshi Gupta, San Diego, CA (US); Ashwin Sampath, San Diego, CA (US); Gavin Horn, La Jolla, CA (US); Anastasios Stamoulis, San Diego, CA (US); Nikhil Jain, Mendham, NJ (US)

(73) Assignee: QUALCOMM Incorporated, San Diego, CA (US)

(*) Notice: Subject to any disclaimer, the term of this patent is extended or adjusted under 35 U.S.C. 154(b) by 1507 days.

(21) Appl. No.: 11/553,383

(22) Filed: Oct. 26, 2006

(65) Prior Publication Data

US 2007/0105573 A1 May 10, 2007

Related U.S. Application Data

(60) Provisional application No. 60/730,631, filed on Oct. 26, 2005, provisional application No. 60/730,727, filed on Oct. 26, 2005.

(51) Int. Cl.
*H04W 72/00* (2009.01)
*H04W 72/04* (2009.01)
*H04W 28/24* (2009.01)
*H04W 72/08* (2009.01)

(52) U.S. Cl.
CPC .......... *H04W 72/0406* (2013.01); *H04W 28/24* (2013.01); *H04W 72/082* (2013.01)
USPC ........ 455/452.2; 455/450; 455/448; 455/434; 455/63.1; 370/329

(58) Field of Classification Search
USPC .......................... 455/450–454, 63.1; 370/328
See application file for complete search history.

(56) References Cited

U.S. PATENT DOCUMENTS

| 3,256,517 | A | 6/1966 | Saltzberg et al. |
| 5,274,644 | A | 12/1993 | Berger et al. |
| 5,594,946 | A | 1/1997 | Menich et al. |
| 5,815,491 | A | 9/1998 | Guibert et al. |

(Continued)

FOREIGN PATENT DOCUMENTS

| AR | 056160 | 9/2007 |
| AR | 056731 | 10/2007 |

(Continued)

OTHER PUBLICATIONS

International Search Report—PCT/US06/060279, International Search Authority—European Patent Office, Oct. 11, 2007.

(Continued)

*Primary Examiner* — Vladimir Magloire
(74) *Attorney, Agent, or Firm* — Eric Ho

(57) ABSTRACT

Systems and methods are disclosed that facilitate dynamically adjusting a number of resources, such as channels, frequencies, tones, etc., occupied by a node (e.g., an access point, and access terminal, etc.) in accordance with various aspects. A level of service experienced at the node may be determined, and a resource utilization message (RUM) may be generated if the level of service is at or below a predetermined threshold level (e.g., an acceptable level of service). The RUM may indicate a number of resources selected by the node for subsequent use, and may be transmitted to one or more other nodes.

38 Claims, 18 Drawing Sheets

(56) References Cited

U.S. PATENT DOCUMENTS

| | | | |
|---|---|---|---|
| 5,956,642 A * | 9/1999 | Larsson et al. ............ 455/449 |
| 5,970,410 A | 10/1999 | Carney et al. |
| 6,023,621 A | 2/2000 | Jackson et al. |
| 6,295,453 B1 | 9/2001 | Desgagne et al. |
| 6,418,137 B1 | 7/2002 | Bontu et al. |
| 6,480,481 B1 | 11/2002 | Park et al. |
| 6,519,462 B1 * | 2/2003 | Lu et al. .................. 455/453 |
| 6,522,628 B1 | 2/2003 | Patel et al. |
| 6,535,735 B2 | 3/2003 | Underbrink et al. |
| 6,535,738 B1 | 3/2003 | Bomar et al. |
| 6,556,582 B1 | 4/2003 | Redi |
| 6,570,847 B1 | 5/2003 | Hosein et al. |
| 6,600,726 B1 | 7/2003 | Nevo et al. |
| 6,711,416 B1 | 3/2004 | Zhang |
| 6,748,231 B2 | 6/2004 | Pan et al. |
| 6,920,171 B2 | 7/2005 | Souissi et al. |
| 6,940,824 B2 | 9/2005 | Shibutani |
| 6,940,842 B2 | 9/2005 | Proctor |
| 6,957,042 B2 | 10/2005 | Williams |
| 7,020,472 B2 | 3/2006 | Schmidt |
| 7,075,890 B2 | 7/2006 | Ozer et al. |
| 7,116,938 B2 | 10/2006 | Monroe et al. |
| 7,126,913 B1 | 10/2006 | Patel et al. |
| 7,184,393 B1 | 2/2007 | Singh et al. |
| 7,228,149 B2 | 6/2007 | Backes |
| 7,230,991 B2 | 6/2007 | Sang et al. |
| 7,239,637 B2 | 7/2007 | Umayabashi |
| 7,418,039 B2 | 8/2008 | Simmonds |
| 7,480,264 B1 | 1/2009 | Duo et al. |
| 7,483,674 B2 | 1/2009 | Haartsen et al. |
| 7,486,735 B2 | 2/2009 | Dubuc et al. |
| 7,633,909 B1 | 12/2009 | Jones et al. |
| 7,653,410 B2 | 1/2010 | Itsuki |
| 7,843,960 B2 | 11/2010 | Hara |
| 7,889,813 B2 | 2/2011 | Wang et al. |
| 8,014,277 B2 | 9/2011 | Julian et al. |
| 8,081,592 B2 | 12/2011 | Sampath et al. |
| 2001/0012778 A1 | 8/2001 | Eriksson et al. |
| 2002/0003782 A1 | 1/2002 | Pan et al. |
| 2002/0061009 A1 | 5/2002 | Sorensen |
| 2002/0061073 A1 | 5/2002 | Huang et al. |
| 2002/0067736 A1 | 6/2002 | Garcia-Luna-Aceves et al. |
| 2002/0071387 A1 | 6/2002 | Horiguchi et al. |
| 2002/0077151 A1 | 6/2002 | Matthews et al. |
| 2002/0115464 A1 | 8/2002 | Hwang et al. |
| 2003/0076848 A1 | 4/2003 | Bremler-Barr et al. |
| 2003/0103470 A1 | 6/2003 | Yafuso |
| 2003/0108059 A1 | 6/2003 | Yew et al. |
| 2003/0181211 A1 | 9/2003 | Razavilar et al. |
| 2004/0062295 A1 | 4/2004 | Khawand et al. |
| 2004/0072565 A1 | 4/2004 | Nobukiyo et al. |
| 2004/0081095 A1 | 4/2004 | Liu et al. |
| 2004/0160914 A1 | 8/2004 | Sarkar |
| 2004/0176090 A1 | 9/2004 | Mudigonda et al. |
| 2004/0185868 A1 * | 9/2004 | Jain et al. ................ 455/453 |
| 2004/0192370 A1 | 9/2004 | Backes et al. |
| 2004/0213175 A1 | 10/2004 | Meiling et al. |
| 2004/0213176 A1 | 10/2004 | Proctor, Jr. et al. |
| 2004/0223455 A1 | 11/2004 | Fong et al. |
| 2004/0248580 A1 | 12/2004 | Backes et al. |
| 2004/0259556 A1 | 12/2004 | Czys |
| 2005/0041622 A1 | 2/2005 | Dubuc et al. |
| 2005/0048972 A1 | 3/2005 | Dorenbosch et al. |
| 2005/0083845 A1 | 4/2005 | Compton et al. |
| 2005/0085249 A1 | 4/2005 | Goldstein et al. |
| 2005/0123027 A1 | 6/2005 | Cioffi et al. |
| 2005/0130664 A1 | 6/2005 | Sang et al. |
| 2005/0163070 A1 | 7/2005 | Farnham et al. |
| 2005/0169206 A1 | 8/2005 | Nozaki |
| 2005/0169229 A1 | 8/2005 | Cho et al. |
| 2005/0227624 A1 | 10/2005 | Hiddink et al. |
| 2005/0265225 A1 | 12/2005 | Mahadevappa et al. |
| 2006/0046765 A1 | 3/2006 | Kogure |
| 2006/0068820 A1 | 3/2006 | Sugaya et al. |
| 2006/0072518 A1 | 4/2006 | Pan et al. |
| 2006/0083161 A1 | 4/2006 | Laroia et al. |
| 2006/0140290 A1 | 6/2006 | Li et al. |
| 2006/0292988 A1 | 12/2006 | Yuen et al. |
| 2007/0091825 A1 | 4/2007 | Budampati et al. |
| 2007/0105574 A1 | 5/2007 | Gupta et al. |
| 2007/0105576 A1 | 5/2007 | Gupta et al. |
| 2007/0115817 A1 | 5/2007 | Gupta et al. |
| 2008/0214224 A1 | 9/2008 | Ostman et al. |
| 2009/0175324 A1 | 7/2009 | Sampath et al. |
| 2009/0176503 A1 | 7/2009 | Sampath et al. |
| 2010/0087148 A1 | 4/2010 | Srinivasan et al. |
| 2010/0260133 A1 | 10/2010 | Sampath et al. |
| 2011/0105065 A1 | 5/2011 | Sampath et al. |
| 2011/0110240 A1 | 5/2011 | Bergquist et al. |

FOREIGN PATENT DOCUMENTS

| | | |
|---|---|---|
| CA | 2625968 A1 | 5/2007 |
| CA | 2626378 A1 | 5/2007 |
| CN | 1324192 A | 11/2001 |
| CN | 1497865 | 5/2004 |
| CN | 1589051 A | 3/2005 |
| EP | 1115217 A2 | 7/2001 |
| EP | 1179961 | 2/2002 |
| EP | 1404071 | 3/2004 |
| GB | 2398963 A | 9/2004 |
| JP | 58219845 A | 12/1983 |
| JP | 11234742 A | 8/1999 |
| JP | 11252114 | 9/1999 |
| JP | 2001103018 | 4/2001 |
| JP | 13195268 | 7/2001 |
| JP | 2001516166 A | 9/2001 |
| JP | 2003143644 | 5/2003 |
| JP | 2003259414 | 9/2003 |
| JP | 2003333646 | 11/2003 |
| JP | 2004260845 | 9/2004 |
| JP | 2004274321 | 9/2004 |
| JP | 2004274745 A | 9/2004 |
| JP | 2004282474 | 10/2004 |
| JP | 2005094529 A | 4/2005 |
| JP | 2005252645 A | 9/2005 |
| JP | 2006094229 | 4/2006 |
| JP | 2007529158 | 10/2007 |
| RU | 2145775 | 2/2000 |
| RU | 2208913 | 7/2003 |
| RU | 2005100843 | 7/2005 |
| RU | 2004131637 | 8/2005 |
| TW | 577212 B | 2/2004 |
| TW | I226153 | 1/2005 |
| TW | M260941 | 4/2005 |
| TW | I232635 | 5/2005 |
| TW | I234940 | 6/2005 |
| WO | WO9205556 A1 | 4/1992 |
| WO | WO9937106 | 7/1999 |
| WO | WO03019798 A2 | 3/2003 |
| WO | WO03021811 A1 | 3/2003 |
| WO | WO03028245 | 4/2003 |
| WO | WO03092231 A1 | 11/2003 |
| WO | WO03094546 | 11/2003 |
| WO | WO2004060001 A1 | 7/2004 |
| WO | WO2005020508 A1 | 3/2005 |
| WO | 2005032055 | 4/2005 |
| WO | WO2005055527 | 6/2005 |
| WO | WO2007144692 A1 | 12/2007 |

OTHER PUBLICATIONS

International Preliminary Report on Patentability—PCT/US06/060279—International Search Authority, European Patent Office—Jun. 27, 2008.

Written Opinion—PCT/US06/060279, International Search Authority—European Patent Office, Oct. 11, 2007.

Cao, Yanbo et al., "A novel channel allocation scheme to enhance resource utilization in CDMA/TDD," 2003. ICCT 2003. International Conference on Communication Technology Proceedings, vol. 2, Apr. 9-11, 2003. pp. 821-824 vol. 2.

Taiwanese Search Report—No. 095139644—TIPO, Mar. 18, 2010.

(56) References Cited

OTHER PUBLICATIONS

Xu L. et al., "Fair resource allocation with guaranteed statistical QoS for multimedia traffic in wideband CDMA cellular network," IEEE Transactions on Mobile Computing, vol. 4, Issue 2, Mar.-Apr. 2005, pp. 166-177.

Translation of Office Action in Japan application 2008-538179 corresponding to U.S. Appl. No. 11/553,423, citing US6522628, JP11252114, US6556582 and WO03028245 dated Dec. 7, 2010.

Diepstraten et al., 802.11 Tutorial, 802.11 Mac Entity, MAC Basics Access Mechanism Privacy and Access Control, Mar. 1996, pp. 1-22.

* cited by examiner

USING RESOURCE UTILIZATION MESSAGES IN A MULTI-CARRIER MAC TO ACHIEVE FAIRNESS

CLAIM OF PRIORITY UNDER 35 U.S.C. §119

This application claims the benefit of U.S. Provisional Application Ser. No. 60/730,631, entitled "WEIGHTED FAIR SHARING OF A WIRELESS CHANNEL USING RESOURCE UTILIZATION MASKS," filed on Oct. 26, 2005 and U.S. Provisional Application Ser. No. 60/730,727, entitled "INTERFERENCE MANAGEMENT USING RESOURCE UTILIZATION MASKS SENT AT CONSTANT POWER SPECTRAL DENSITY (PSD)," filed on Oct. 26, 2005, both of which are incorporated herein by reference.

CROSS REFERENCE TO CO-PENDING APPLICATIONS

This application also contains subject matter related to (1) U.S. patent application Ser. No. 11/553,414 entitled "INTERFERENCE MANAGEMENT USING RESOURCE UTILIZATION MASKS SENT AT CONSTANT PSD," (2) U.S. patent application Ser. No. 11/553,417 entitled "FLEXIBLE MEDIUM ACCESS CONTROL (MAC) FOR AD HOC DEPLOYED WIRELESS NETWORKS," and (3) U.S. patent application Ser. No. 11/553,420 entitled "WEIGHTED FAIR SHARING OF A WIRELESS CHANNEL USING RESOURCE UTILIZATION MASKS," all of which are filed on the same date as this application and are also incorporated herein by reference.

BACKGROUND

I. Field

The following description relates generally to wireless communications, and more particularly to reducing interference and improving throughput and channel quality in a wireless communication environment.

II. Background

Wireless communication systems have become a prevalent means by which a majority of people worldwide communicate. Wireless communication devices have become smaller and more powerful in order to meet consumer needs and to improve portability and convenience. The increase in processing power in mobile devices such as cellular telephones has led to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. Accordingly, a need in the art exists for systems and/or methodologies that facilitate reducing interference and improving throughput in a wireless communication environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to systems and/or methods that provide unified technology for wide and local wireless communication networks in order to facilitate achieving benefits associated with both cellular and Wi-Fi technologies while mitigating drawbacks associated therewith. For instance, cellular networks may be arranged according to a planned deployment, which can increase efficiency when designing or building a network, while Wi-Fi networks are typically deployed in a more convenient, ad hoc manner. Wi-Fi networks may additionally facilitate providing a symmetrical medium access control (MAC) channel for access points and access terminals, as well as backhaul support with in-band wireless capability, which are not provided by cellular systems.

The unified technologies described herein facilitate providing a symmetrical MAC and backhaul support with in-band wireless capability. Moreover, the subject innovation facilitates deploying the network in a flexible manner. The methods described in this invention allow the performance to adapt according to the deployment, thus providing good efficiency if the deployment is planned or semi-planned, and providing adequate robustness if the network is unplanned. That is, various aspects described herein permit a network to be deployed using a planned deployment, (e.g., as in a cellular deployment scenario), an ad hoc deployment (e.g., such as may be utilized for a Wi-Fi network deployment), or a combination of the two. Still furthermore, other aspects relate to supporting nodes with varied transmission power levels and achieving inter-cell fairness with regard to resource allocation, which aspects are not adequately supported by Wi-Fi or cellular systems.

For example, according to some aspects, weighted fair-sharing of a wireless channel may be facilitated by joint scheduling of a transmission by both a transmitter and a receiver using a resource utilization message (RUM), whereby a transmitter requests a set of resources based on knowledge of availability in its neighborhood, and a receiver grants a subset of the requested channels based on knowledge of availability in its neighborhood. The transmitter learns of availability based on listening to receivers in its vicinity and the receiver learns of potential interference by listening to transmitters in its vicinity. According to related aspects, RUMs may be weighted to indicate not only that a node is disadvantaged (as a receiver of data transmissions due to the interference it sees while receiving) and desires a collision avoidance mode of transmission, but also the degree to which the node is disadvantaged. A RUM-receiving node may utilize the fact that it has received a RUM, as well as the weight thereof, to determine an appropriate response. As an example, such an advertisement of weights enables collision avoidance in a fair manner. The invention describes such a methodology.

According to other aspects, a RUM-rejection threshold (RRT) may be employed to facilitate determining whether to respond to a received RUM. For instance, a metric may be calculated using various parameters and/or information comprised by the received RUM, and the metric may be compared to the RRT to determine whether the sending node's RUM warrants a response. According to a related aspect, a RUM sending node may indicate its degree of disadvantage by indicating a number of channels for which the RUM applies, such that the number of channels (in general, these could be resources, frequency sub-carriers and/or time slots) is indicative of the degree of disadvantage. If the degree of disadvantage is reduced in response to the RUM, then the number of channels for which the RUM is sent may be reduced for a subsequent RUM transmission. If the degree of disadvantage is not reduced, then the number of channels for which the RUM applies may be increased for a subsequent RUM transmission.

A RUM may be sent at a constant power spectral density (PSD), and a receiving node may employ the received power spectral density and/or received power of the RUM to estimate a radio frequency (RF) channel gain between itself and the RUM sending node to determine whether it will cause interference at the sending node (e.g., above a predetermined acceptable threshold level) if it transmits. Thus, there may be situations wherein a RUM receiving node is able to decode the RUM from the RUM sending node, but determines that it will not cause interference. When a RUM-receiving node determines that it should obey the RUM, it can do so by choosing to back-off from that resource completely or by choosing to use a sufficiently reduced transmit power to bring its estimated potential interference level below the predetermined acceptable threshold level. Thus, "hard" interferences avoidance (complete backoff) and "soft" interference avoidance (power control) are both supported in a unified manner. According to a related aspect, the RUM may be employed by the receiving node to determine a channel gain between the receiving node and the RUM-sending node in order to facilitate a determination of whether or not to transmit based on estimated interference caused at the sending node.

According to an aspect, a method of wireless communication may comprise determining a level of received service at a node, generating a resource utilization message (RUM) if the level of received service is equal to or below a predetermined threshold level of received service, selecting a number of one or more resources for which to transmit the RUM, and transmitting the RUM for the selected one or more resources.

Another aspect relates to an apparatus that facilitates wireless communication, comprising a determining module that determines a level of received service at a node, a generating module that generates a resource utilization message (RUM) if the level of received service is equal to or below a predetermined threshold level of received service, a selecting module that selects a number of one more resources for which to transmit the RUM, and a transmitting module that transmits the RUM for the selected one or more resources.

Another aspect relates to an apparatus that facilitates wireless communication, comprising means for determining a level of received service at a node, means for generating a resource utilization message (RUM) if the level of received service is equal to or below a predetermined threshold level of received service, means for selecting a number of one or more resources for which to transmit the RUM, and means for transmitting the RUM for the selected one or more resources.

Still another aspect relates to a machine-readable medium comprising instructions for data communication, wherein the instructions upon execution cause the machine to determine a level of received service at a node, generate a resource utilization message (RUM) if the level of received service is equal to or below a predetermined threshold level of received service, select a number of one or more resources for which to transmit the RUM, and transmit the RUM for the selected one or more resources.

Yet another aspect relates to a processor that facilitates data communication, the processor being configured to determine a level of received service at a node, generate a resource utilization message (RUM) if the level of received service is equal to or below a predetermined threshold level of received service, select a number of one or more resources for which to transmit the RUM, and transmit the RUM for the selected one or more resources.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
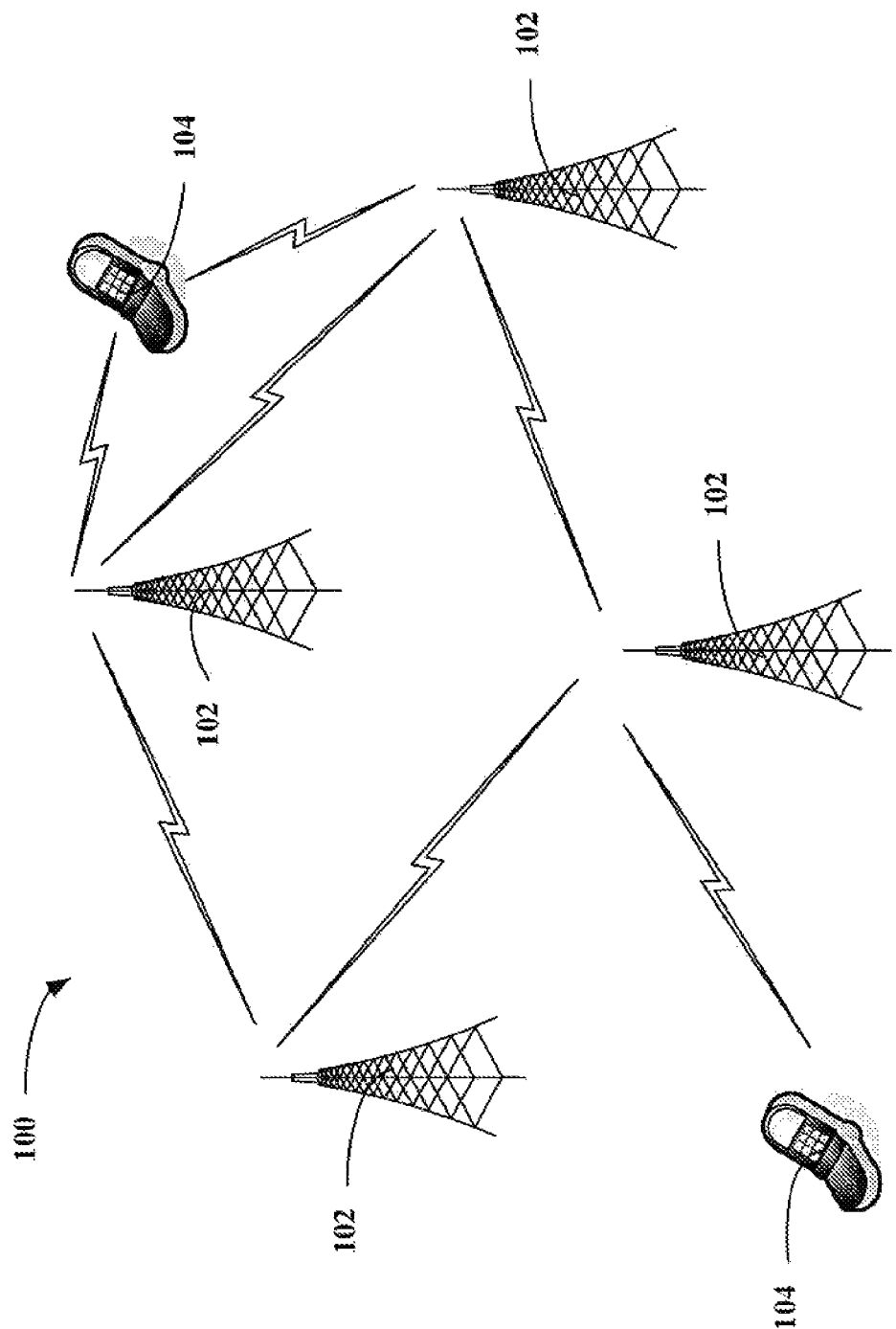
FIG. 1 illustrates a wireless communication system with multiple base stations and multiple terminals, such as may be utilized in conjunction with one or more aspects.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any aspect or design described herein as "exemplary" is not necessarily to be construed as preferred or advantageous over other aspects or designs.

It will be understood that a "node," as used herein, may be an access terminal or an access point, and that each node may be a receiving node as well as a transmitting node. For example, each node may comprise at least one receive antenna and associated receiver chain, as well as at least one transmit antenna and associated transmit chain. Moreover, each node may comprise one or more processors to execute software code for performing any and all of the methods and/or protocols described herein, as well as memory for storing data and/or computer-executable instructions associated with the various methods and/or protocols described herein.

Referring now to FIG. 1, a wireless network communication system 100 is illustrated in accordance with various aspects presented herein. System 100 can comprise a plurality of nodes, such as one or more base stations 102 (e.g., cellular, Wi-Fi or ad hoc, . . . ) in one or more sectors that receive, transmit, repeat, etc., wireless communication signals to each other and/or to one or more other nodes, such as access terminals 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.) as will be appreciated by one skilled in the art. Access terminals 104 can be, for example, cellular phones, smart phones, laptops, handheld communication devices, handheld computing devices, satellite radios, global positioning systems, PDAs, and/or any other suitable device for communicating over a wireless network.

The following discussion is provided to facilitate understanding of the various systems and/or methodologies described herein. According to various aspects, node weights can be assigned (e.g., to transmitting and/or receiving nodes), where each node weight is a function of a number of flows supported by the node. "Flow," as used herein, represents a transmission coming into or out of a node. The total weight of the node can be determined by summing the weights of all flows passing through the node. For example, Constant Bit Rate (CBR) flows can have predetermined weights, data flows can have weights proportional to their type (e.g., HTTP, FTP, . . . ), etc. Moreover, each node may be assigned a predetermined static weight that may be added to the flow weight of each node in order to provide extra priority to each node. Node weight may also be dynamic and reflect the current conditions of the flows that a node carries. For example, the weight may correspond to the worst throughput of a flow being carried (received) at that node. In essence, the weight represents the degree of disadvantage that the node is experiencing and is used in doing fair channel access amongst a set of interfering nodes contending for a common resource.

Request messages, grant messages, and data transmissions may be power controlled: however, a node may nonetheless experience excessive interference that causes its signal-to-interference noise (SINR) levels to be unacceptable. In order to mitigate undesirably low SINR, resource utilization messages (RUMs) may be utilized, which can be receiver-side (RxRUM) and/or transmitter-side (TxRUM). An RxRUM may be broadcast by a receiver when interference levels on the receiver's desired channels exceed a predetermined threshold level. The RxRUM may contain a list of granted channels upon which the receiver desires reduced interference, as well as node weight information. Additionally, the RxRUM may be transmitted at a constant power spectral density (PSD) or at a constant power. Nodes that decode the RxRUM (e.g., transmitters contending with the receiver emitting the RxRUM, . . . ) can react to the RxRUM. For instance, nodes hearing the RxRUM can calculate their respective channel gains from the receiver (e.g., by measuring the received PSD and with knowledge of the constant PSD at which the RxRUM was sent) and can reduce their respective transmission power levels to mitigate interference. RxRUM recipients may even choose to backoff completely from the indicated channels on the RxRUM. In order to ensure that interference avoidance happens in a fair manner, that is, to ensure that all nodes get a fair share of transmission opportunities, weights may be included in the RxRUM. The weight of a given node can be utilized to calculate the fair share of resources for allocation to the node. According to an example, thresholds used for sending and/or reacting to a RUM can be determined based on the behavior of a system. For instance, in a pure collision avoidance type of system, a RUM can be sent for every transmission, and any node hearing the RUM can react by not transmitting on the associated channel.

If a channel bit mask, indicating which channels the RUM applies for, is included in the RUM, then an additional dimension for collision avoidance can be realized, which may be useful when a receiver needs to schedule a small amount of data over a part of the channel and does not want a transmitter to completely back off from the entire channel. This aspect may provide finer granularity in the collision avoidance mechanism, which may be important for bursty traffic.

A TxRUM may be broadcast by a transmitter when the transmitter is unable to request adequate resources (e.g., where a transmitter hears one or more RxRUMs that force it to backoff on most of the channels). The TxRUM may be broadcast before the actual transmission, to inform neighboring receivers of impending interference. The TxRUM can inform all receivers within the listening range that, based on the RxRUMs the transmitter has heard, the transmitter believes it has the most valid claim to bandwidth. The TxRUM can carry information about the weight of the transmitter node, which can be used by neighboring nodes to calculate their respective shares of resources. Additionally, the TxRUM may be sent out at a PSD or transmit power that proportional to a power level at which data is transmitted. It will be appreciated that the TxRUM need not be transmitted at a constant (e.g., high) PSD since only potentially affected nodes need to be made aware of transmitter's condition.

The RxRUM carries weight information that is intended to convey to all transmitters within "listening" range (e.g., whether they send data to the receiver or not) the degree to which the receiver has been starved for bandwidth due to interference from other transmissions. The weight may represent a degree of disadvantage and may be larger when the receiver has been more disadvantaged and smaller when less disadvantaged. As an example, if throughput is used to measure the degree of disadvantage, then one possible relationship may be represented as:

$$RxRUM\ \text{Weight} = Q\left(\frac{R_{target}}{R_{actual}}\right)$$

where $R_{target}$ represents the desired throughput, $R_{actual}$ is the actual throughput being achieved, and $Q(x)$ represents the quantized value of x. When there is a single low at the receiver, then $R_{target}$ may represent the minimum desired throughput for that flow, and $R_{actual}$ may represent the average throughput that has been achieved for that flow. Note that higher value weights representing a greater degree of disadvantage is a matter of convention. In a similar manner, a convention where higher value weights represent lower degree of disadvantage may be utilized as long as the weight resolution logic is appropriately modified. For example, one could use the ratio of actual throughput to target throughput (the inverse of the example shown above) to calculate the weights.

When there are multiple flows at the receiver, with potentially different $R_{target}$ values, then the receiver may choose to set the weight based on the most disadvantaged flow. For example:

$$RxRUM\ \text{Weight} = Q\left(\max_j\left(\frac{R^j_{target}}{R^j_{actual}}\right)\right)$$

where j is the flow index at the receiver. Other options, such as basing the weight on the sum of the flow throughput, may be performed as well. Note that the functional forms used for the weights in the above description are purely for illustration. The weight may be calculated in a variety of different manners and using different metrics than throughputs. According to a related aspect, the receiver can determine whether it has data outstanding from a sender (e.g., a transmitter). This is true if it has received a request, or if it has received a prior request that it has not granted. In this case, the receiver can send out an RxRUM when $R_{actual}$ is below $R_{target}$.

A TxRUM may carry a single bit of information conveying whether it is present or not. A transmitter may set the TxRUM bit by performing a predefined series of actions. For example, the transmitter can collect RxRUMs it has recently heard, including a RxRUM from its own receiver if the receiver has sent one. If the transmitter has not received any RxRUMs, it may send a request to its receiver without sending a TxRUM. If the only RxRUM is from its own receiver, then the transmitter may send a request and a TxRUM.

Alternatively, if the transmitter has received RxRUMs, including one from its own receiver, the transmitter may sort the RxRUMs based on the RxRUM weights. If the transmitter's own receiver has the highest weight, then the transmitter may send a TxRUM and a request. However, if the transmitter's own receiver is not the highest weight, then the transmitter need not send a request or a TxRUM. In the event that the transmitter's own receiver is one of several RxRUMs, all at the highest weight, then the transmitter sends a TxRUM and request with probability defined by: 1/(all RxRUMs at highest weight). According to another aspect, if the receiver has received RxRUMs that to not include one from its own receiver, then the transmitter may not send a request. Note that the entire sequence of RxRUM processing described above can be applied even in the case without TxRUMs. In such a case, the logic is applied by a transmitter node to determine whether to send a request to its receiver or not and if so, for what channels.

Based on the requests and/or TxRUMs that a receiver hears, the receiver may decide to grant a given request. When a transmitter has not made a request, the receiver need not send a grant. If the receiver has heard TxRUMs, but none from a transmitter that it is serving, then the receiver does not send a grant. If the receiver hears a TxRUM only from transmitters that it is serving, then it may decide to make a grant. If the receiver has heard TxRUMs from its own transmitter as well as from a transmitter that it is not serving, then two outcomes are possible. For instance, if a running average of the transmission rate is at least $R_{target}$, then the receiver does not grant (e.g., it forces its transmitter to be quiet). Otherwise the receiver grants with probability defined as 1.0/(sum TxRUMs heard). If the transmitter has been granted, the transmitter transmits a data frame that can be received by the receiver. Upon a successful transmission, both transmitter and receiver update the average rate for the connection.

According to other aspects, scheduling actions can be programmed to implement equal grade of service (EGOS) or other schemes for managing fairness and quality of service among multiple transmitters and/or flows to a receiver. A scheduler uses its knowledge of the rates received by its partner nodes to decide which nodes to schedule. However, the scheduler can abide by the interference rules imposed by the medium access channel over which it operates. Specifically, the scheduler can obey the RUMs that it hears from its neighbors. For instance, on a forward link, a scheduler at an access point (AP) may send requests to all access terminals (ATs) for which it has traffic, unless it is blocked by RxRUMs. The AP may receive grants back from one or more of these ATs. An AT may not send a grant if it is superseded by a competing TxRUM. The AP may then schedule the AT that has the highest priority, according to the scheduling algorithm, and may transmit.

On a reverse link, each AT that has traffic to send may request the AP. An AT will not send a request if it is blocked by a RxRUM. The AP schedules the AT that has the highest priority, according to the scheduling algorithm, while abiding by any TxRUMs that it has heard in a previous slot. The AP then sends a grant to the AT. Upon receiving a grant, the AT transmits.

Figure 2:
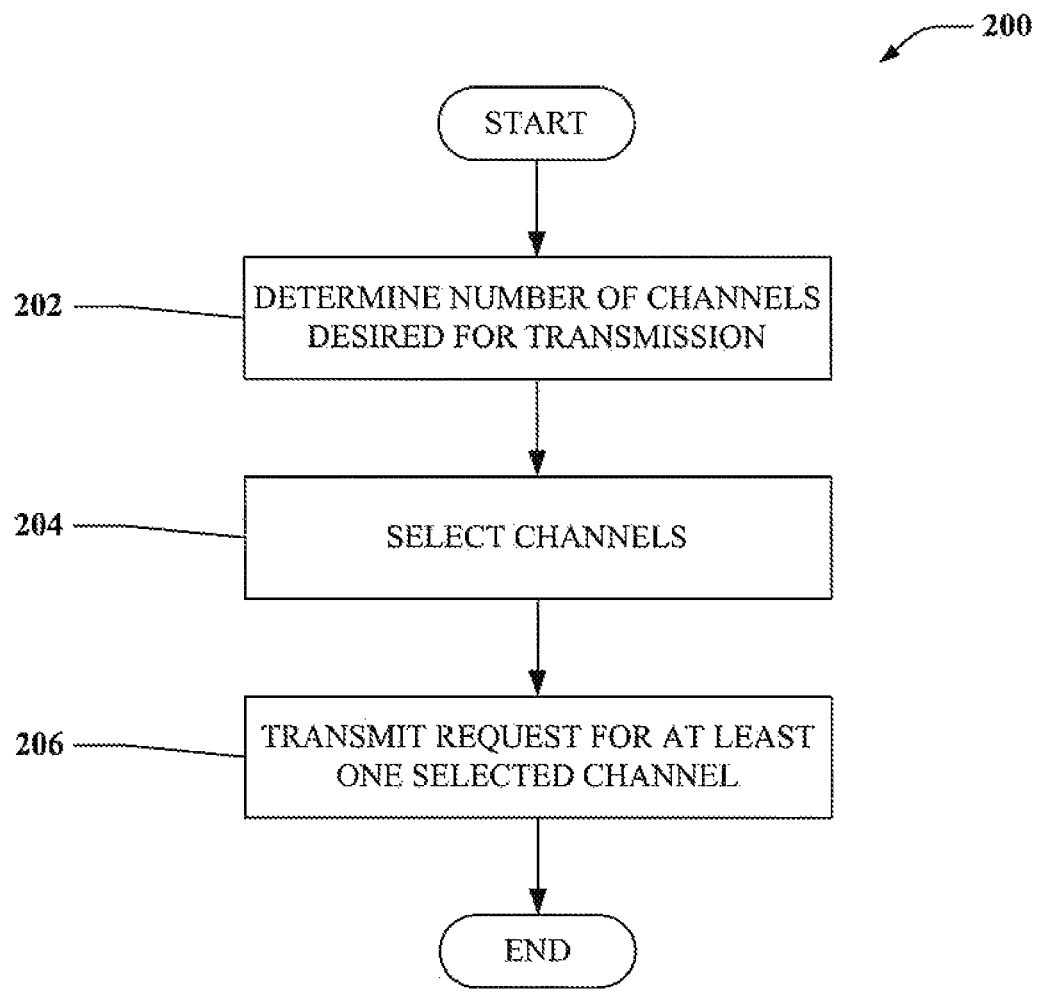
FIG. 2 is an illustration of a methodology for performing weighted fair sharing of a wireless channel using resource utilization masks/messages (RUMs), in accordance with one or more aspects described herein.

FIG. 2 is an illustration of a methodology 200 for performing weighted fair sharing of a wireless channel using resource utilization masks/messages (RUMs), in accordance with one or more aspects described herein. At 202, a determination may be made regarding a number of channels over which a node (e.g., an access point, an access terminal, etc.) would prefer to transmit. Such determination may be based on, for instance, need associated with a given amount of data to be transmitted, interference experienced at the node, or any other suitable parameter (e.g., latency, data rate, spectral efficiency, etc.) At 204, one or more channels may be selected to achieve the desired number of channels. Channel selection may be performed with a preference for available channels. For instance, channels that are known to have been available in a preceding transmission period may be selected before channels that were occupied in the preceding transmission period. At 206, a request for the selected channel(s) may be transmitted. The request may comprise a bitmask of preferred channels over which a transmitter (e.g., a transmitting node, . . . ) intends to transmit data, and may be sent from the transmitter to a receiver (e.g., a receiving node, a cell phone, smartphone, wireless communication device, access point, . . . ). The request may be a request for a first plurality of channels that were not blocked in a most recent time slot, a request for a second plurality of channels if the first plurality of channels is insufficient for data transmission, etc. The request message sent at 206 may additionally be power-controlled to ensure a desired level of reliability at the receiver.

According to other aspects, the determination of the number of channels desired for a given transmission may be a function of a weight associated with the node, a function of weights associated with other nodes requesting channels, a function of a number of channels available for transmission, or any combination of the preceding factors. For example, a weight may be a function of a number of flows through the node, a level of interference experienced at the node, etc. According to other features, channel selection may comprise partitioning channels into one or more sets, and may be based in part on a received resource utilization message (RUM) that indicates that one or more channels in a set of channels is unavailable. The RUM may be evaluated to determine whether a given channel is available (e.g., is not identified by the RUM). For example a determination may be made that a given channel is available if it is not listed in the RUM. Another example is that a channel is deemed available even if a RUM was received for that channel, but the advertised weight for that channel was lower than the weight advertised in the RUM sent by the node's receiver.

Figure 3:
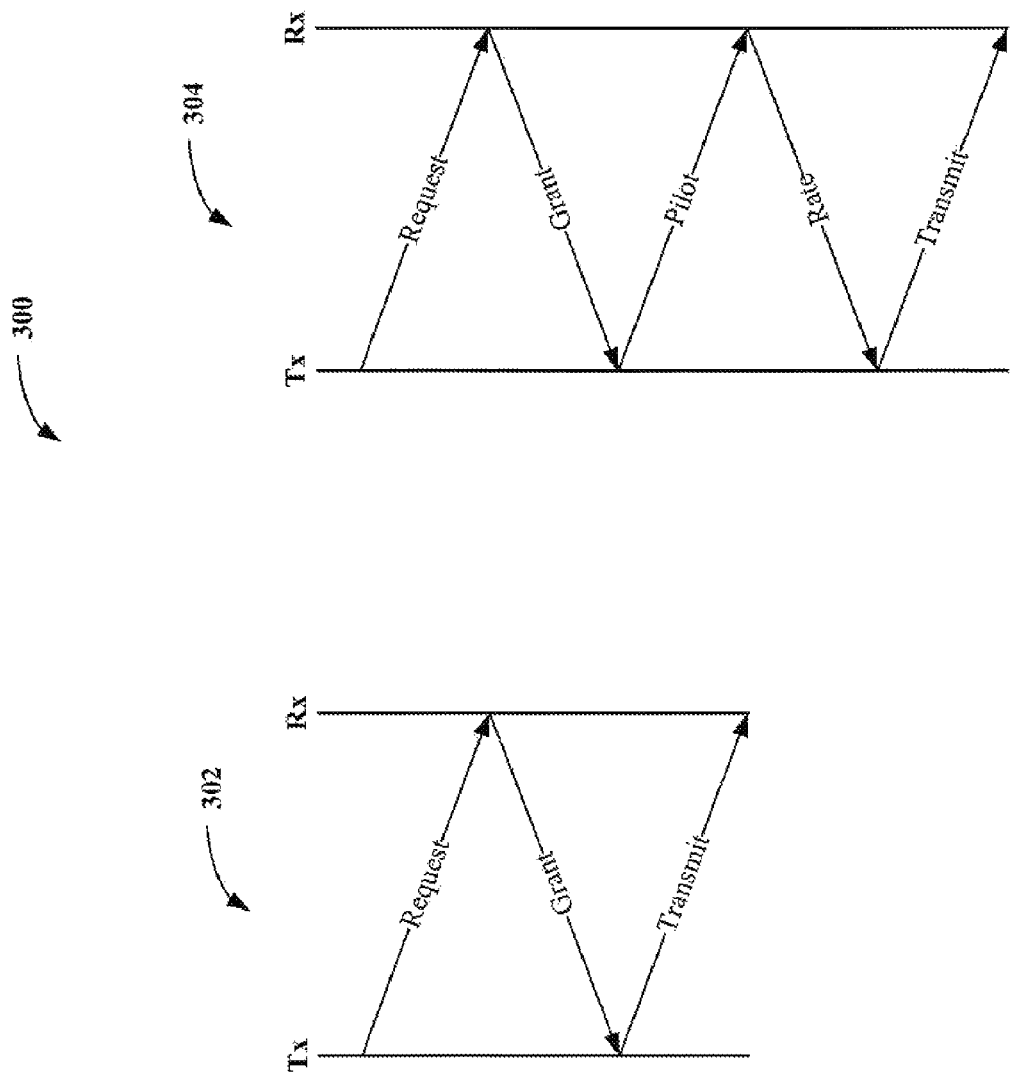
FIG. 3 illustrates a sequence of request-grant events that can facilitate resource allocation, in accordance with one or more aspects described herein.

FIG. 3 illustrates a sequence of request-grant events that facilitate resource allocation, in accordance with one or more aspects described herein. A first series of events 302 is depicted, comprising a request that is sent from a transmitter to a receiver. Upon receiving the request, the receiver can send a grant message to the transmitter, which grants all or a subset of channels requested by the transmitter. The transmitter may then transmit data over some or all of the granted channels.

According to a related aspect, a sequence of events 304 can comprise a request that is sent from a transmitter to a receiver. The request can include a list of channels over which the transmitter would like to transmit data to the receiver. The receiver may then send a grant message to the transmitter, which indicates all or a subset of the desired channels have been granted. The transmitter may then transmit a pilot message to the receiver, upon receipt of which the receiver may transmit rate information back to the transmitter, to facilitate mitigating an undesirably low SINR. Upon receipt of the rate information, the transmitter may proceed with data transmission over the granted channels and at the indicated transmission rate.

According to a related aspect, a TxRUM may be broadcast by a transmitter when the transmitter is unable to request adequate resources (e.g., where a transmitter hears one or more RxRUMs that occupy most of the transmitter's available channels). Such a TxRUM may carry information about the weight of the transmitter node, which may be used by neighboring nodes to calculate their respective shares of resources. Additionally, the TxRUM may be sent out at a PSD proportional to a power level at which data is transmitted. It will be appreciated that the TxRUM need not be transmitted at a constant (e.g., high) PSD since only potentially affected nodes need to be made aware of transmitter's condition.

The sequence of events 302 and 304 may be performed in view of a plurality of constraints that may be enforced during a communication event. For example the transmitter may request any channel(s) that have not been blocked by a RxRUM in a previous time slot. The requested channels may be prioritized with a preference for a successful channel in a most recent transmission cycle. In the event that there are insufficient channels, the transmitter may request additional channels to obtain a fair share thereof by sending TxRUMs to announce the contention for the additional channels. The fair share of channels can then be determined according to the number and weights of contending neighbors (e.g., nodes), in view of RxRUMs that have been heard.

The grant from the receiver may be a subset of the channels listed in the request. The receiver can be endowed with authority to avoid channels exhibiting high interference levels during a most recent transmission. In the event that the granted channels are insufficient, the receiver may add channels (e.g., up to the transmitter's fair share) by sending one or more RxRUMs. The transmitter's fair share of channels can be determined by, for instance, evaluating the number and weights of neighboring nodes, in view of TxRUMs that have been heard (e.g., received).

When transmitting, the transmitter may send data over the all or a subset of channels granted in the grant message. The transmitter may reduce transmission power on some or all channels upon bearing an RxRUM. In the event that the transmitter hears a grant and multiple RxRUMs on a same channel, the transmitter may transmit with reciprocal probability. For instance, if one grant and three RxRUMs are heard for a single channel, then the transmitter may transmit with a probability of 1/3, etc. (e.g., the probability that the transmitter will employ the channel is 1/3).

According to other aspects, excess bandwidth may be allocated according to a sharing scheme that is unfettered with regard to the above constraints. For instance, weight-based scheduling, as described above, can facilitate weighted fair sharing of resources. However, in a case where excess bandwidth is present, allocation of resources (e.g., above the minimum fair share), need not be constrained. For instance, a scenario may be considered wherein two nodes with full buffers each have weights of 100 (e.g., corresponding to flow rates of 100 kbps), and are sharing a channel. In this situation, the nodes can share the channel equally. If they experience varying channel qualities, each of the two nodes may be granted, for example, 300 kbps. However, it may be desirable to give only 200 kbps to node 1, in order to increase node 2's share to 500 kbps. That is, in such situations, it may be desirable to share any excess bandwidth in some unfair fashion, in order to achieve greater sector throughput. The weighting mechanism may be extended in a simple manner to facilitate unfair sharing. For instance, in addition to the weight, each node may also have a notion of its assigned rate, which information can be associated with a service purchased by an AT. A node may continually update its average rate (over some suitable interval) and can send out RUMs when its average throughput is below the assigned rate to ensure that nodes will not vie for the excess resources beyond their assigned rate, which can then be apportioned in other sharing schemes.

Figure 4:
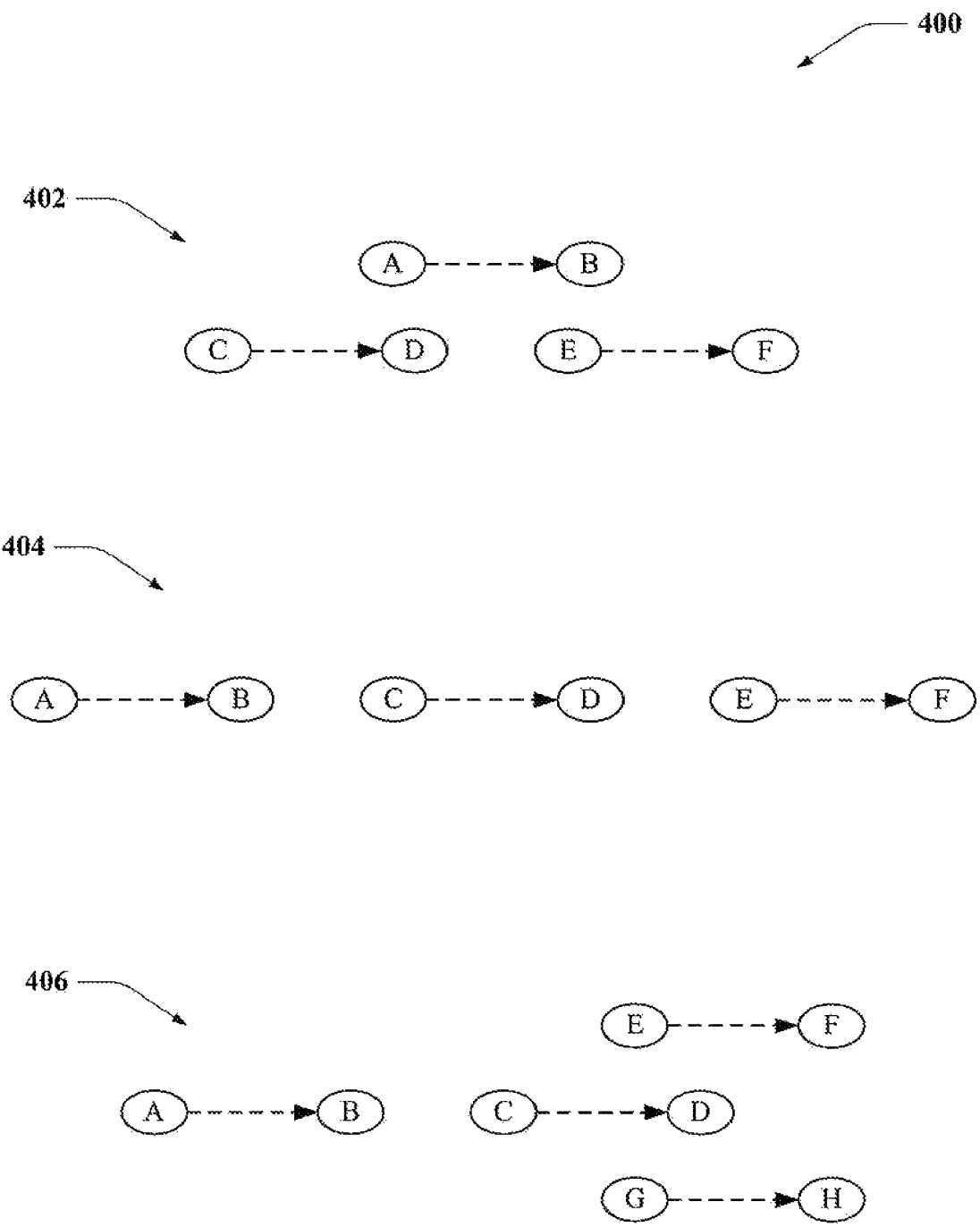
FIG. 4 is an illustration of several topologies that facilitate understanding of request-grant schemes, in accordance with various aspects.

FIG. 4 is an illustration of several topologies that facilitate understanding of request-grant schemes, in accordance with various aspects. The first topology 402 has three links (A-B, C-D, E-F) in close proximity, where every node A-F can hear the RUM from every other node. The second topology 404 has three links in a chain, and the middle link (C-D) interferes with both outer links (A-B and E-F), while the outer links do not interfere with each other. The RUMs may be simulated, according to this example, such that the range of a RUM is two nodes. The third topology 406 comprises three links on the right hand side (C-D, E-F, and G-H) that interfere with each other and can hear each other's RUMs. The single link (A-B) on the left side only interferes with the link (C-D).

According to various examples, for the topologies described above, performance of three systems is described in Table 1, below. In a "Full Information" scenario, the availability of a RxRUM with bitmask and weights, as well as a TxRUM with bitmask and weights, is assumed. In the "Partial Information" scenario, RxRUM with bitmask and weights, and TxRUM with weights but no bitmasks, are assumed. Finally, in the "RxRUM Alone" scenario, no TxRUMs are sent out.

TABLE 1

|  | Full Info (RxRUM + TxRUM bitmask) | Partial Info (RxRUM + TxRUM weight) | RxRUM alone |
| --- | --- | --- | --- |
| Topology 1 | Conv: 4.6 cycles | Conv: 9.1 cycles | Conv: 10.3 cycles |
|  | AB = 0.33 | AB = 0.328 | AB = 0.33 |
|  | CD = 0.33 | CD = 0.329 | CD = 0.33 |
|  | EF = 0.33 | EF = 0.325 | EF = 0.33 |
| Topology 2 | Conv: 3.8 cycles | Conv: 5.4 cycles | Conv: never |
|  | AB = 0.5 | AB = 0.5 | AB = 0.62 |
|  | CD = 0.5 | CD = 0.5 | CD = 0.36 |
|  | EF = 0.5 | EF = 0.5 | EF = 0.51 |
| Topology 3 | Conv: 5.5 cycles | Conv: 9.3 cycles | Conv: never |
|  | AB = 0.67 | AB = 0.6.65 | AB = 0.77 |
|  | CD = 0.33 | CD = 0.33 | CD = 0.21 |
|  | EF = 0.53 | EF = 0.33 | EF = 0.31 |
|  | GH = 0.33 | GH = 0.33 | GH = 0.31 |

As seen from Table 1, the Partial Info proposal is able to achieve fair share of the weights at a small delay in convergence. The convergence numbers show the number of cycles it takes for the schemes to converge to a stable apportioning of the available channels. Subsequently, the nodes may continue to utilize the same channels.

Figure 5:
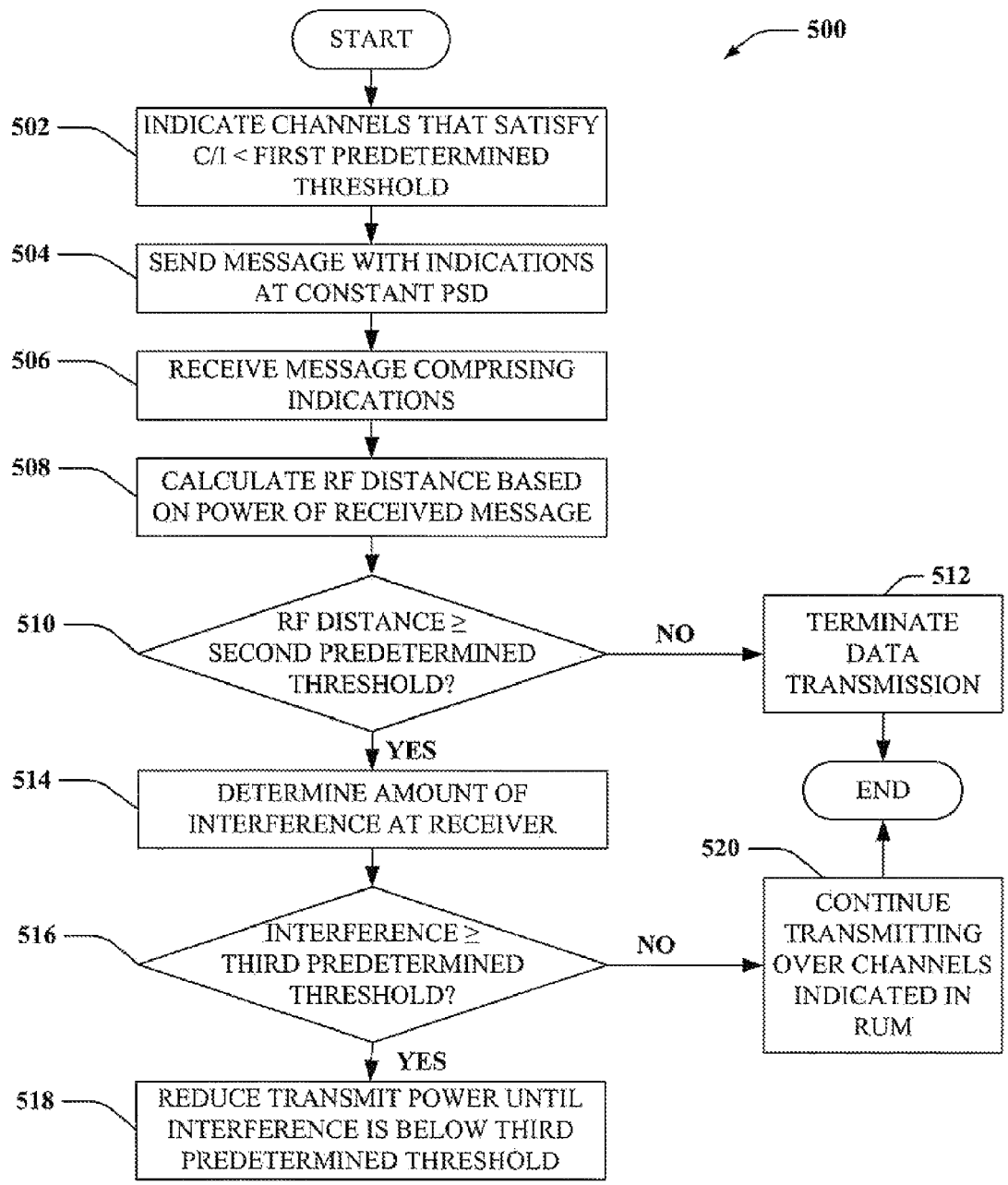
FIG. 5 illustrates a methodology for managing interference by employing a resource utilization message (RUM) that is transmitted at a constant power spectral density (PSD), in accordance with one or more aspects presented herein.

FIG. 5 is an illustration of a methodology 500 for managing interference by employing a resource utilization message (RUM) that is transmitted at a constant power spectral density (PSD), in accordance with one or more aspects presented herein. Request messages, grant messages, and transmissions may be power controlled; however, a node may nonetheless experience excessive interference that causes its signal-to-interference noise ratio (SINR) levels to be unacceptable. In order to mitigate undesirably low SINR, RUMs may be utilized, which can be receiver-side (RxRUM) and/or transmitter-side (TxRUM). A RxRUM may be broadcast by a receiver when interference levels on the receiver's desired channels exceed a predetermined threshold level. The RxRUM may contain a list of channels upon which the receiver desires reduced interference, as well as node weight information. Additionally, the RxRUM may be transmitted at a constant power spectral density (PSD). Nodes that "hear" the RxRUM (e.g., transmitters contending with the receiver emitting the RxRUM,) may react to the RxRUM, by stopping their transmission, or by reducing the transmitted power.

For example, in ad hoc deployment of wireless nodes, a carrier-to-interference ratio (C/I) may be undesirably low at some nodes, which can hinder successful transmission. It will be appreciated that interference levels employed to calculate C/I may comprise noise, such that C/I may similarly be expressed as C/(I+N), where N is noise. In such cases, a receiver may manage interference by requesting that other nodes in the vicinity either reduce their respective transmission powers or backoff completely from the indicated channels. At 502, an indication of channels (e.g., in a multi-channel system) that exhibit a C/I that is below a first predetermined threshold nay be generated. At 504, a message may be transmitted, the message comprising information indicative of which channels exhibit inadequate C/Is. For example, a first node (e.g., a receiver) may broadcast a RUM along with a bitmask comprising information indicative of channels having C/Is that are undesirably low. The RUM may additionally be sent at a constant PSD that is known to all nodes in the network. In this manner, nodes with varying power levels may broadcast with the same PSD.

The message (e.g., RUM) may be received by other nodes, at 506. Upon receipt of the RUM, a second node (e.g., a transmitter) may utilize the PSD associated with the RUM to calculate the radio frequency (RF) distance (e.g. channel gain) between itself and the first node, at 508. The reaction of a given node to the RUM may vary according to the RF distance. For instance, a comparison of the RF distance to a second predetermined threshold may be performed at 510. If the RF distance is below the second predetermined threshold (e.g., the first node and the second node are close to each other), then the second node can cease any further transmissions over channels indicated in the RUM in order to mitigate interference, at 512. Alternatively, if the second node and the first node are sufficiently distant from each other (e.g., the RF distance between them is equal to or greater than the second predetermined threshold when compared at 510), then the second node can utilize the RF distance information to predict a magnitude of interference that will be caused at the first node and that is attributable to the second node if the second node were to continue to transmit over channels indicated in the RUM, at 514. At 516, the predicted interference level may be compared to a third predetermined threshold level.

For example, the third predetermined threshold may be a fixed portion of a target interference-over-thermal (IOT) level, which is the ratio of interference noise to thermal noise power measured over a common bandwidth (e.g., approximately 25% of a target IOT of 6 dB, or some other threshold level). If the predicted interference is below the threshold level, then the second node may continue transmitting over the channels indicated in the RUM, at 520. If, however, the predicted interference is determined to be equal to or greater than the third predetermined threshold level, then at 518, the second node may reduce its transmission power level until the predicted interference is below the third threshold level. In this manner, a single message, or RUM, may be employed to indicate interference over multiple channels. By causing interference nodes to reduce power, affected nodes (e.g., receivers, access terminals, access points, . . . ) may receive bits successfully over a subset of the multiple channels, and nodes that reduce their transmission power levels may also be permitted to continue their respective transmissions.

Figure 6:
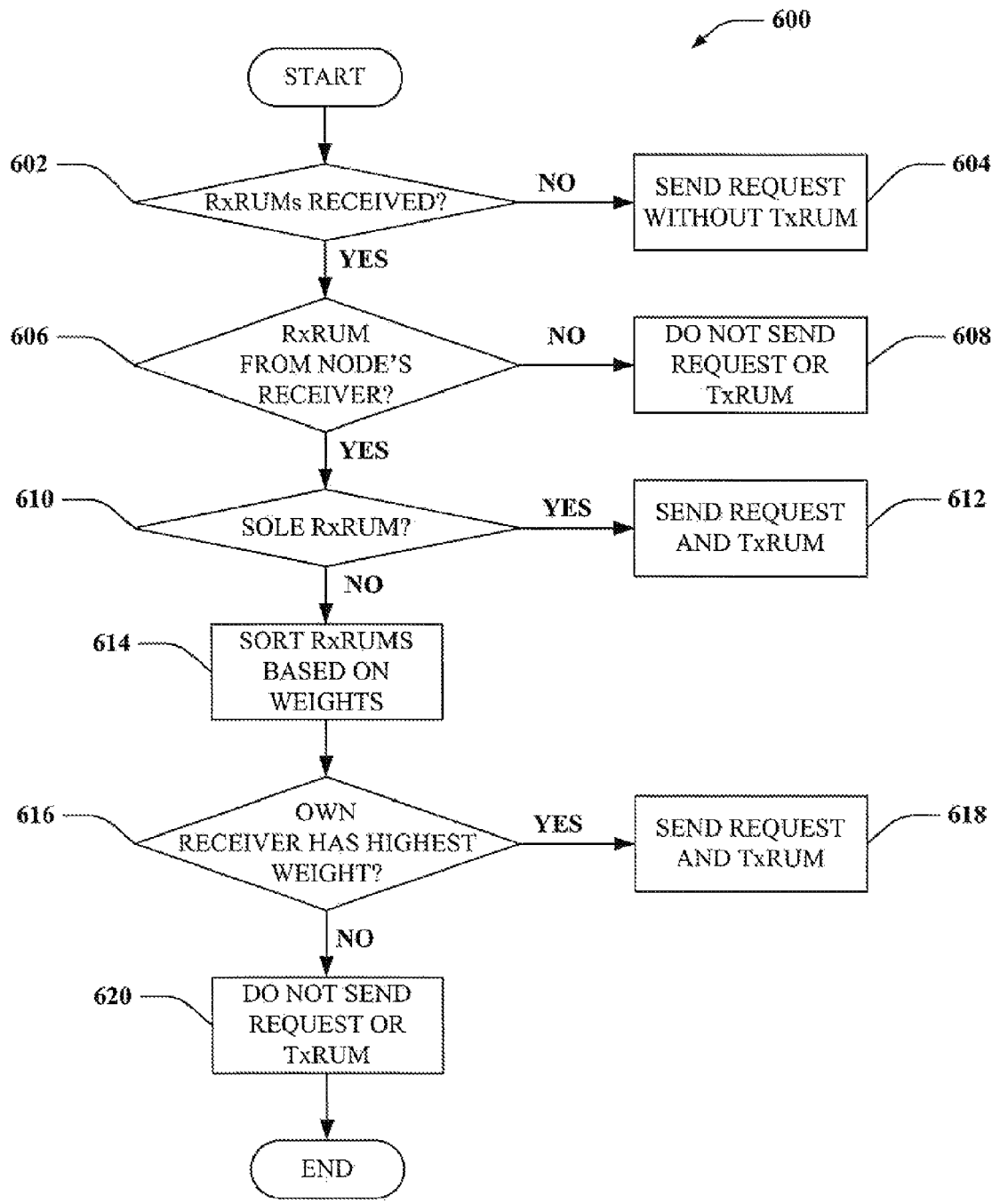
FIG. 6 is an illustration of a methodology for generating TxRUMs and requests to facilitate providing flexible medium access control (MAC) in an ad hoc deployed wireless network, in accordance with one or more aspects.
Figure 7:
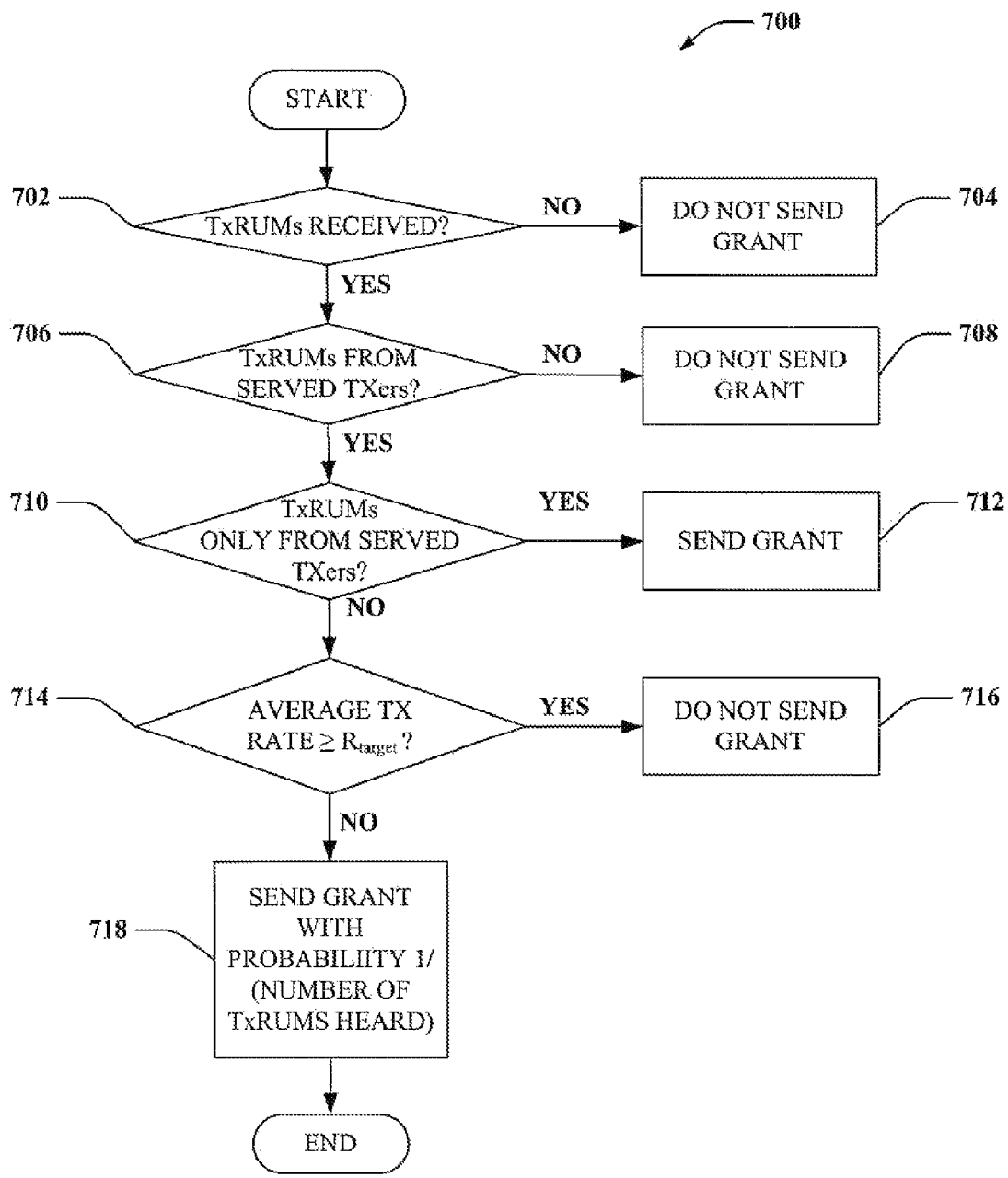
FIG. 7 is an illustration of a methodology for generating a grant for a request to transmit, in accordance with one or more aspects.

With regard to FIGS. 6 and 7, flexible medium access control may be facilitated by permitting a receiver to communicate to one or more transmitters not only that it prefers a collision avoidance mode of transmission, but also a measure of how disadvantaged it is relative to other receivers. In third generation cellular MACs, a need for interference avoidance across cells may be mitigated by employing a planned deployment scheme. Cellular MACs generally achieve high spatial efficiency (bits/unit area), but planned deployment is expensive, time consuming and may not be well suited for hotspot deployments. Conversely, WLAN systems such as those based on the 802.11 family of standards place very few restrictions on deployment, but cost and time savings associated with deploying WLAN systems relative to cellular systems comes at the price of increased interference robustness to be built into the MAC. For instance, 802.11 family uses a MAC that is based on carrier sense multiple access (CSMA). CSMA, fundamentally, is a "listen-before-transmit" approach wherein a node intending to transmit has to first "listen" to the medium, determine that it is idle, and then follow a backoff protocol prior to transmission. A carrier sense MAC may lead to poor utilization, limited fairness control, and susceptibility to hidden and exposed nodes. In order to overcome deficiencies associated with both planned deployment cellular systems and with Wi-Fi/WLAN systems, various aspects described with regard to FIGS. 6 and 7 can employ synchronous control channel transmission (e.g. to send requests, grants, pilots etc), efficient use of RUMs (e.g., an RxRUM may be sent by a receiver when it wants interfering transmitters to backoff, a TxRUM may sent by a transmitter to let its intended receiver and receivers that it interferes with know of its intention to transmit, etc.), as well as improved control channel reliability through reuse (e.g., so that multiple RUMs may be decoded simultaneously at the receiver), etc.

In accordance with some features, RxRUMs may be weighted with a coefficient that is indicative of the degree of disadvantage of the receiver in serving its transmitters. An interfering transmitter may then use both the fact that it heard an RxRUM and the value of the weight associated with the RxRUM to determine a next action. According to an example, when a receiver receives a single flow, the receiver may send RxRUM when $$\frac{RST}{R_{actual}} < T,$$

where RST (RUM sending threshold) is the throughput target for the flow, $R_{actual}$ is the actual achieved throughput calculated as a short-term moving average (e.g., through a single-pole IIR filter, . . . ), and T is a threshold against which the ratio is compared. If the receiver is unable to schedule its transmitter during a particular slot, the rate for that slot may be assumed to be 0. Otherwise the achieved rate in that slot is a sample that may be fed to the averaging filter. The threshold, T, can be set to unity so that whenever the actual throughput falls below the target throughput, the weight is generated and transmitted.

A transmitter can "hear" an RxRUM if it can decode the RxRUM message. A transmitter may optionally ignore the RxRUM message if it estimates that the interference it will cause at the RxRUM sender is below a RUM rejection threshold (RRT). In the instant MAC design, Rx/Tx RUMs, requests and grants may be sent on a control channel which has a very low reuse factor (e.g., ¼ or smaller) to ensure that interference impact on the control information is low. A transmitter may analyze the set of RxRUMs that is has heard, and, if an RxRUM heard from its intended receiver is the highest-weight RxRUM, the transmitter may send a request with a TxRUM indicating to all receivers that can hear the transmitter, (e.g., including its own receiver), that it has won the "contention" and is entitled to use the channel. Other conditions for sending a TxRUM, handling of multiple RxRUMs of equal weight, handling of multiple TxRUMs, requests, etc., are described in greater detail with regard to FIGS. 6 and 7, below. Setting the RxRUM weight and the corresponding actions at the transmitter permits a deterministic resolution of contention, and thereby improved utilization of the shared medium and weighted fair sharing through the setting of the RST. In addition to setting the RST, which controls the probability of RxRUMs being sent out, the setting of the RRT can facilitate controlling a degree to which the system operates in collision avoidance mode.

With regard to the RST, from a system efficiency perspective, the RST may be employed such that a collision avoidance protocol or a simultaneous transmission protocol may invoked based on analysis of which protocol achieves a higher system throughput for a specific user configuration. From a peak-rate perspective or delay-intolerant service, users may be permitted to burst data at a rate higher than that which may be achieved using simultaneous transmissions at the expense of system efficiency. Additionally, certain types of fixed rate traffic channels (e.g., control channels) may require a specific throughput to be achieved, and the RST may be set accordingly. Moreover, certain nodes may have a higher traffic requirement due to aggregation of a large traffic volume. This is particularly true if a wireless backhaul is used in a tree-like architecture and a receiver is scheduling a node that is close to the root of the tree.

One methodology to determine a fixed RST is to set the RST based on the forward link edge spectral efficiency achieved in planned cellular systems. The cell edge spectral efficiency indicates the throughput that an edge user may achieve in a cellular system when the BTS transmits to a given user, with the neighbors being on all the time. This is so in order to ensure that throughput with simultaneous transmissions is no worse than cell edge throughput in a planned cellular system, which may be utilized to trigger a transition into collision avoidance mode to improve throughput (e.g., over that which may be achieved using simultaneous transmission mode). According to other features, RSTs may be different for different users (e.g., users may subscribe to different levels of service associated with different RSTs, ...)

FIG. 6 is an illustration of a methodology 600 for generating TxRUMs and requests to facilitate providing flexible medium access control (MAC) in an ad hoc deployed wireless network, in accordance with one or more aspects. The TxRUM may inform all receivers within the listening range that based on the RxRUMs a transmitter has heard, the transmitter believes it is the one most entitled to bandwidth. A TxRUM carries a single bit of information indicating its presence, and a transmitter may set the TxRUM bit in the following manner.

At 602, the transmitter may determine whether it has just heard (e.g., within a predetermined monitoring period, ...) one or more RxRUMs, including an RxRUM from its own receiver (for example, suppose A is communicating with B and interferes with C and D, then A may hear RxRUMs from B, C and D, with B being its receiver), if it has sent one (i.e. if B has sent one in the running example). As described herein, a "node" may be an access terminal or an access point, and may comprise both a receiver and a transmitter. The usage of terminology such as "transmitter" and "receiver" in this description should therefore be interpreted as "when a node plays the role of transmitter" and "when a node plays the role of a receiver" respectively. If the transmitter has not received any RxRUMs, then at 604 it sends a request to its receiver without sending a TxRUM. If the transmitter has received at least one RxRUM, then at 606 a determination may be made regarding whether an RxRUM has been received from the transmitter's own receiver (e.g., a receiver at the transmitter's node ...). If not, then at 608, a decision may be made to refrain from transmitting a TxRUM and associated request.

If the determination at 606 is positive, then at 610, a further determination may be made regarding whether the RxRUM received from the transmitter's own receiver is the only RxRUM that has been heard. If so, then at 612, the transmitter may send a TxRUM and a request to transmit. If the transmitter has received multiple RxRUMs including the RxRUM from its own receiver, then at 614, the transmitter may proceed to sort the RxRUMs based on weights associated therewith. At 616, a determination may be made regarding whether the RxRUM received from the transmitter's own receiver has a highest weight (e.g., a greatest level of disadvantage) of all the received RxRUMs. If so, then at 618, the transmitter may send both a TxRUM and a request to transmit. If the determination at 616 is negative, then at 620, the transmitter may refrain from transmitting the TxRUM as well as the request. In a scenario in which the transmitter receives an RxRUM from its own receiver as well as one or more other RxRUMs and all are of equal weight, then the transmitter may send a TxRUM and request with probability 1/N, where N is the number of RxRUMs having the highest weight. In one aspect, the logic of FIG. 6 may be applied without any TxRUMs, but rather only requests. That is, the RxRUMs control whether a node can send a request for a particular resource or not.

"Disadvantage," as used herein, may be determined as a function of, for instance, a ratio of a target value to an actual value for a given node. For example, when disadvantage is measured as a function of throughput, spectral efficiency, data rate, or some other parameter where higher values are desirable, then when the node is disadvantaged, the actual value will be relatively lower than the target value. In such cases, a weighted value indicative of the level of disadvantage of the node may be a function of the ratio of the target value to the actual value. In cases where the parameter based upon which disadvantage is based is desired to be low (e.g., latency,), a reciprocal of the ratio of the target value to the actual value may be utilized to generate the weight. As used herein, a node that is described as having a "better" condition relative to another node may be understood to have a lesser level of disadvantage (e.g., the node with the better condition has less interference, less latency, a higher data rate, higher throughput, higher spectral efficiency, etc., than another node to which it is compared).

According to an example, transmitter A and transmitter C may transmit simultaneously (e.g., according to asynchronous media access control scheme wherein transmitters transmit at specified times and receivers transmit at other specified times), to receiver B and receiver D, respectively. Receiver B may determine and/or have predetermined an amount of interference that it is experiencing, and may send an RxRUM to transmitters such as transmitter A and transmitter C. Receiver D need not listen to the RxRUM, as receiver D transmits at the same time as receiver B. To further the example, upon hearing the RxRUM from receiver B, transmitter C may evaluate receiver B's condition as indicated in the RxRUM, and may compare its own condition (which may be known to C or advertised by the RxRUM sent by D) to that of receiver B. Upon the comparison, several actions may be taken by transmitter C.

For instance, upon a determination that transmitter C is experiencing a lower degree of interference than receiver B, transmitter C may back off by refraining from transmitting a request to transmit. Additionally or alternatively, transmitter C may evaluate or determine how much interference it is causing at receiver B (e.g., in a case where RxRUMs from receivers are sent at a same, or constant, powder spectral density. Such a determination may comprise estimating a channel gain to receiver B, selecting a transmit power level, and determining whether a level of interference that would be caused at receiver B by a transmission from transmitter C at the selected transmit power level exceeds a predetermined acceptable threshold interference level. Based on the determination, transmitter C may opt to transmit at a power level that is equal to a previous transmit power level or less.

In the event that transmitter C's condition (e.g., a level of disadvantage with regard to scarcity of resources interference, . . . ) is substantially equal to that of receiver B, transmitter C may evaluate and/or address weights associated with RxRUMs it has heard. For instance, if transmitter C has heard four RUMs having weights of, 3, 5, 5, and 5, and the RxRUM heard from receiver B bears one of the weights of 5 (e.g., has a weight equal to the heaviest weight of all RxRUMs heard by transmitter C), then C would send a request with probability 1/3.

FIG. 7 illustrates a methodology 700 for generating a grant for a request to transmit, in accordance with one or more aspects, At 702, a receiver may assess requests and TxRUMs that it has recently heard or received (e.g., during a predefined monitoring period, . . . ). If no requests have been received, then at 704 the receiver may refrain from sending a grant message. If at least one request and TxRUM has been received, then at 706 a determination may be made regarding whether the received TxRUM(s) is/are from a transmitter that the receiver serves. If not, then at 708, the receiver may refrain from sending a grant. If so, then at 710, the receiver may determine whether all received TxRUMs are from transmitters served by the receiver.

If the determination at 710 is positive, then a grant may be generated and sent to one or more requesting transmitters, at 712. If the determination at 710 is negative and the receiver has received a TxRUM from its own transmitter in addition to a TxRUM from a transmitter that the receiver does not serve, then at 714, a determination may be made regarding whether a running average of the transmission rate is greater than or equal to $R_{target}$. If the running average of the transmission rate is greater than or equal to $R_{target}$, then at 716, the receiver may refrain from granting the requested resources. If not, then at 718, the receiver may send a grant with a probability of 1/N, where N is a number of TxRUMs received. In another aspect, TxRUMs may include weights just as in RxRUMs and when multiple TxRUMs are heard, at least one from one of its transmitters and one from another transmitter, then grants are made based on whether the TxRUM with the highest weight was sent by one of its transmitters or not. In the event of a tie with multiple TxRUMs at highest weight, including one that came from one of its transmitters, a grant is sent with probability m/N, where N is the number of TxRUMs heard at highest weight, m of which came from the receiver's transmitters.

According to related aspects, the receiver may periodically and/or continuously assess whether it has data outstanding from a sender. This is true if the receiver has received a current request or if it has received a prior request that it has not granted. In either case, the receiver may send out an RxRUM whenever the average transmission rate is below $R_{target}$. Additionally, upon a grant of a transmitter's request, the transmitter may transmit a data frame, which may be received by the receiver. If there is data outstanding for the transmitter-receiver pair, then both the transmitter and the receiver may update the average rate information for the connection.

Figure 8:
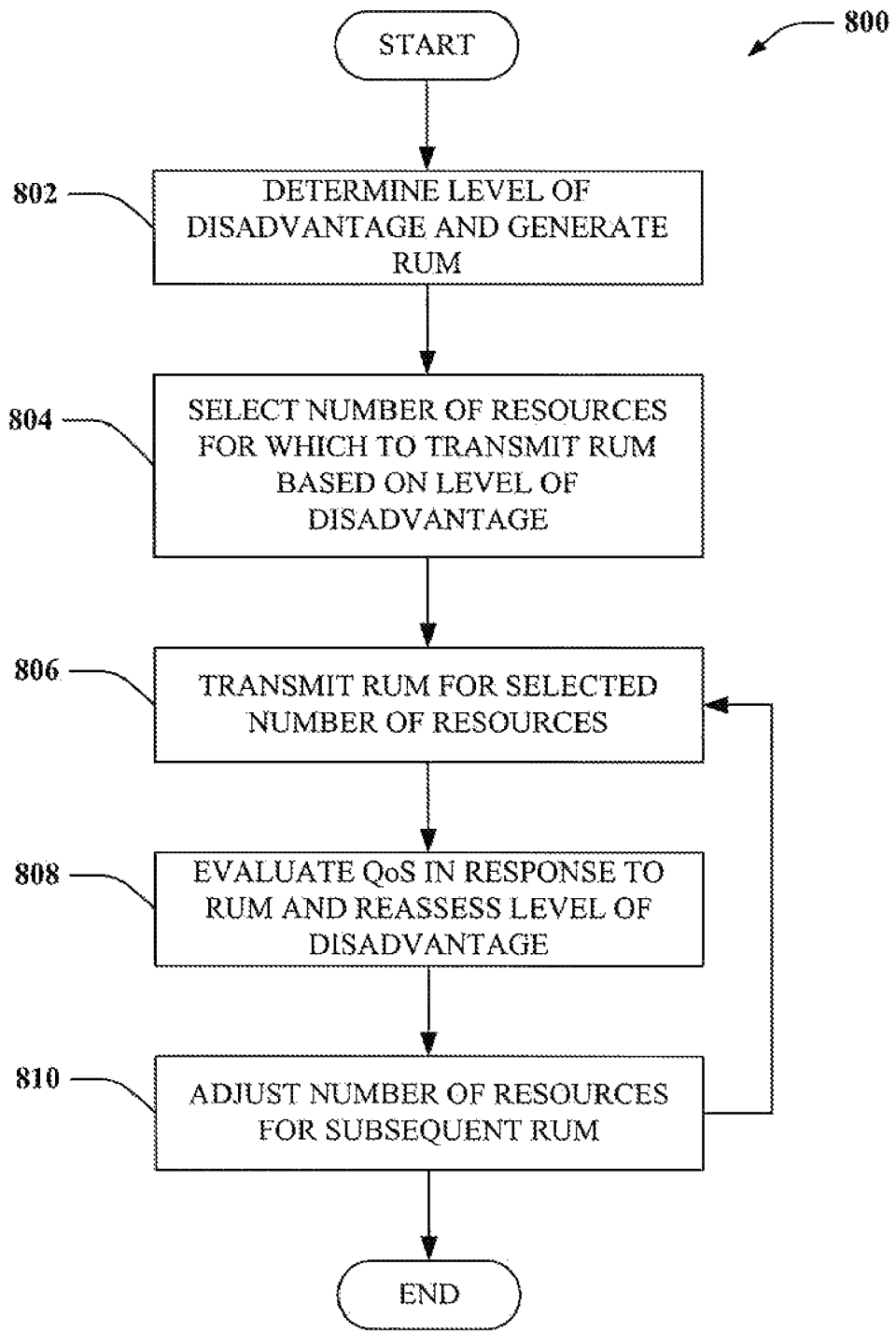
FIG. 8 is an illustration of a methodology for achieving fairness among contending nodes by adjusting a number of subcarriers used to transmit a RUM according to a level of disadvantage associated with a given node, in accordance with one or more aspects.

FIG. 8 is an illustration of a methodology 800 for achieving fairness among contending nodes by adjusting a number of channels for which to transmit a RUM according to a level of disadvantage associated with a given node, in accordance with one or more aspects. As described above with regard to preceding figures, an RxRUM is sent out to indicate that a receiver is experiencing poor communication conditions and wants a reduction in the interference it faces. The RxRUM includes a weight, which quantifies the degree of disadvantage that the node is experiencing. According to an aspect, the weight may be set equal to RST/average throughput. Here, RST is the average throughput that the node desires. When a transmitting node hears multiple RxRUMs, it may utilize respective weights to resolve the contention between them. If the RxRUM with the highest weight originated from the transmitter's own receiver, then it may decide to transmit. If not, the transmitter may refrain from transmitting.

A TxRUM is sent out by the transmitter to announce an impending transmission, and has two purposes. First, the TxRUM lets a receiver know that its RxRUM won the local contention, so it may go schedule a transmission. Second, the TxRUM informs other neighboring receivers of impending interference. When a system supports multiple channels, the RUMs may carry a bitmask in addition to the weight. The bitmask indicates the channels on which this RUM is applicable.

The RxRUM allows a node to clear interference in its immediate neighborhood, since nodes that receive the RxRUM may be induced to refrain from transmitting. While weights allow for a fair contention (e.g., a node with the greatest disadvantage wins), having a multichannel MAC may provide another degree of freedom. The number of channels for which a node may send RxRUMs may be based on its degree of disadvantage to nodes with very poor history to catch up more rapidly. When the RxRUMs are successful and the transmission rate received by the node in response thereto improves its condition, the node may reduce the number of channels for which it sends RxRUMs. If, due to heavy congestion, the RUMs do not succeed initially and throughput does not improve, the node may increase the number of channels for which it sends RUMs. In a very congested situation, a node may become highly disadvantaged and may send RxRUMs for all channels, thereby degenerating to the single carrier case.

According to the method, at 802, a level of disadvantage may be determined for a node and a RUM may be generated to indicate the level of disadvantage to other nodes within listening range. For example, the level of disadvantage may be determined as a function of a level of received service at the node, which may be impacted by various parameters, such as latency, IOT, C/I, throughput, data rate, spectral efficiency, etc. At 804, a number of channels for which to send the RUM may be selected, which may be commensurate to the level of disadvantage (e.g., the greater the disadvantage, the greater the number of channels). The RUM may be transmitted for the channels at 806. A quality of service (QoS) may be measured for the node and disadvantage may be reassessed to determine whether the node's condition has improved, at 808. Based on the measured QoS, the number of channels for which a subsequent RUM is transmitted may be adjusted, at 810. For instance, if the node's QoS did not improve or worsened, then the number of channels for which a subsequent RUM is transmitted may be increased at 810 to improve the level of service received at the node. If the node's QoS has improved, then at 810 the number of channels for which a subsequent RUM is transmitted may be reduced to conserve resources. The method may revert to 806 for further iterations of RUM transmission, service evaluation, and channel number adjustment. The decision on whether to increase or decrease the number of channels for which the RUM is sent may also be a function of the QoS metric being used by the node. For example, increasing the number of channels for which RUMs are sent (based on continued or worsening level of disadvantage) may make sense for throughput/data rate type metrics, but may not be so for latency metrics.

According to related aspects, node-based and/or traffic-based priority may be incorporated by allowing nodes with higher priority to commandeer a greater number of channels than nodes of lower priority. For example, a disadvantaged video caller may receive eight channels at once, while a similarly disadvantaged voice caller only receive two carriers. A maximum number of channels that a node may obtain may also be limited. The upper limit may be determined by the type of traffic being carried (e.g., small voice packets typically do not need more than a few channels), the power class of the node (e.g., a weak transmitter may not spread its power over too large a bandwidth) the distance to the receiver and the resultant receive PSD, etc. In this manner, method 800 may further reduce interference and improve resource savings. Still other aspects provide for employing a bitmask to indicate a number of channels allocated to the node. For instance, a 6-bit mask may be utilized to indicate that RUMs may be sent for up to six channels. The node may additionally request that an interfering node refrain from transmitting over all or a subset of the allocated subcarriers.

Figure 9:
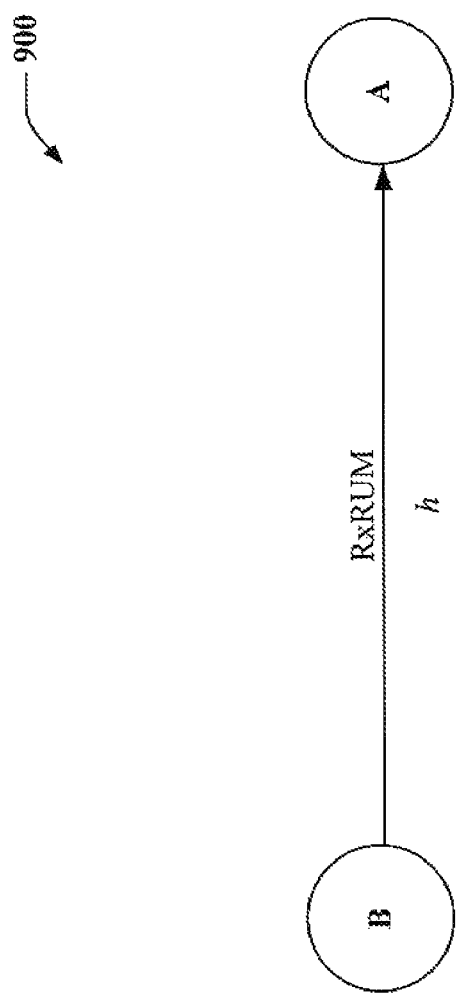
FIG. 9 is an illustration of an RxRUM transmission between two nodes at a constant power spectral density (PSD), in accordance with one or more aspects.

FIG. 9 is an illustration of an RxRUM transmission between two nodes at a constant power spectral density (PSD), in accordance with one or more aspects. When a node experiences heavy interference, it may benefit from limiting the interference caused by other nodes, which in turn permits better spatial reuse and improved fairness. In the 802.11 family of protocols, request-to-send (RTS) and clear-to-send (CTS) packets are employed to achieve fairness. Nodes that hear the RTS stop transmission and permit the requesting node to successfully transmit the packet. However, often this mechanism results in a large number of nodes that are turned off unnecessarily. Furthermore, nodes may send RTS and CTS at full power over the entire bandwidth. If some nodes had higher power than others, then the range for RTS and CTS for different nodes could be different. Thus, a low power node that may be interfered with strongly by a high power node may be unable to shut off the high power node through RTS/CTS, because the high power node would be out-of-range for the low power node. In such a case, the high power node is a permanent "hidden" node to the low power node. Even if the low power node sends an RTS or a CTS to one of its transmitters or receivers, it will not be able to shut off the high power node. The 802.11 MAC, therefore, requires all nodes to have equal power. This introduces limitations in performance, in particular from a coverage perspective.

The mechanism of FIG. 9 facilitates broadcasting a RUM from a receiver at a node that is experiencing an undesirably low SINR for one or more channels. The RUM may be transmitted at a constant, known PSD, regardless of the transmit power capability of the node and a receiving node may observe the received PSD and calculate a channel gain between itself and the RUM-transmitting node. Once the channel gain is known, the receiving node may determine an amount of interference that it is likely to cause (e.g., based in part on its own transmit power) at the RUM-transmitting node, and may decide whether or not to temporarily refrain from transmitting.

In cases where nodes in a network have different transmit powers, nodes that hear the RUM may decide whether to shut down based on their respective known transmit powers and calculated channel gains. Thus, a low-power transmitter need not unnecessarily shut down since it will not cause significant interference. In this manner, only interference-causing nodes may be shut down, thus mitigating the afore-mentioned deficiencies of conventional RTS-CTS mechanisms.

For example, a first node (Node A) may receive an RxRUM from a second node (Node B) over a channel, h. The RxRUM may be transmitted at a power level, pRxRUM, and a received signal value, X, may be evaluated such that X is equal to the sum of the channel, h, multiplied by the transmission power, pRxRUM, plus noise. Node A may then perform a channel estimation protocol to estimate h by dividing the received signal value, X, by pRxRUM. If node B's weight higher than node A's weight, then Node A may further estimate interference that a Node A transmission may cause to Node B, by multiplying the channel estimate by a desired transmit power ($p_A$), such that:

$$I_A = h_{est} * p_A$$

where $I_A$ is the interference caused by node A at node B.

According to an example, consider a system where maximum transmission power, M, is determined to be 2 Watts, and minimum transmission bandwidth is 5 MHz, then a maximum PSD is 2 Watts/5 MHz, or 0.4 W/MHz. Suppose the minimum transmit power in the system is 200 mW. Then, the RUM is designed to have a range such that is equal to the range of the maximum allowed PSD in the system. This power spectral density for the 200 mW transmitter and data rate for the RUM are then chosen to equalize those ranges. It will be understood that the foregoing example is present for illustrative purposes and that the systems and/or methods described herein are not limited to the specific values presented above, but rather may utilize any suitable values.

Figure 10:
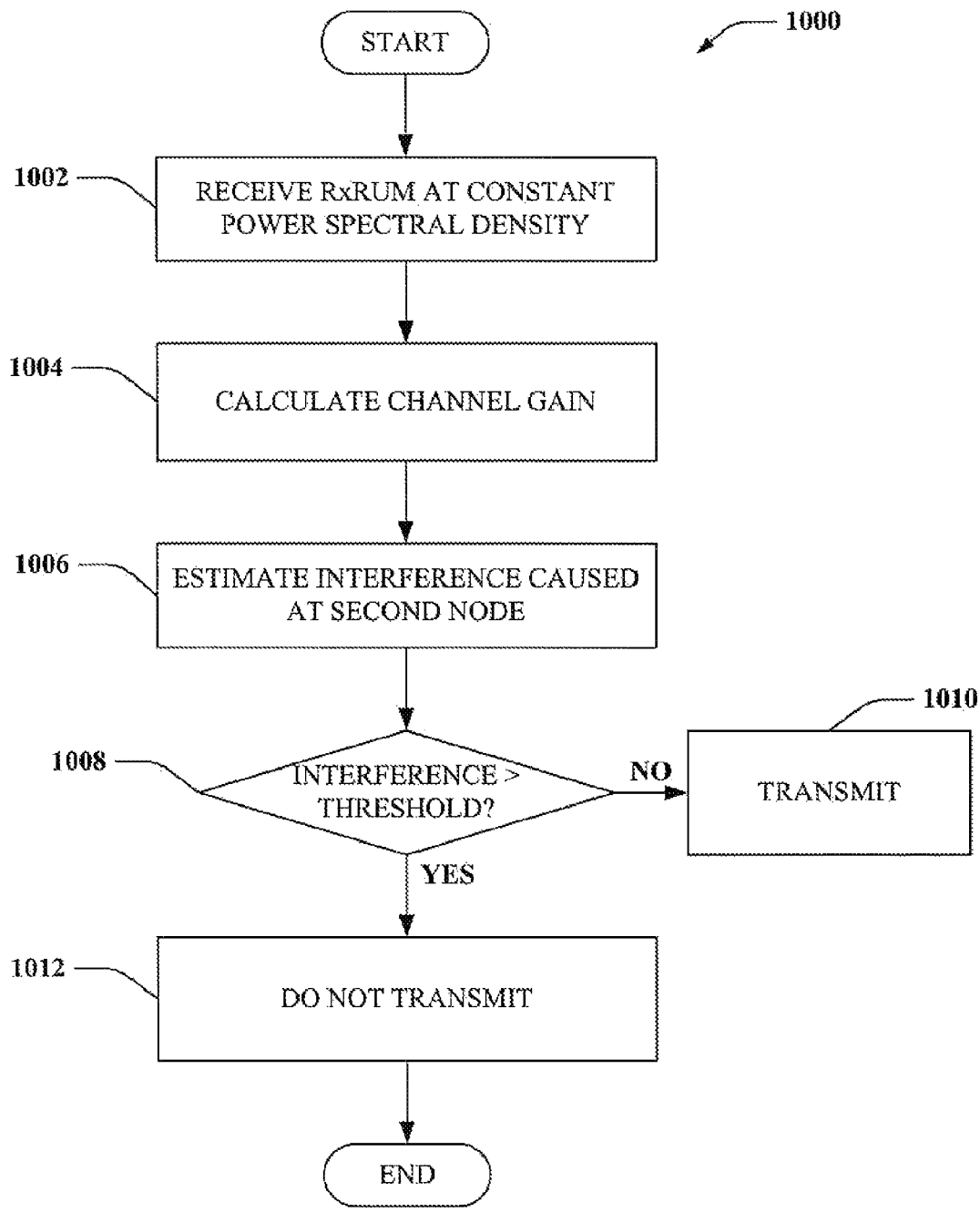
FIG. 10 is an illustration of a methodology for employing a constant PSD for RUM transmission to facilitate estimating an amount of interference that will be caused by a first node at a second node, in accordance with one or more aspects.

FIG. 10 is an illustration of a methodology 1000 for employing a constant PSD for RUM transmission to facilitate estimating an amount of interference that will be caused by a first node at a second node, in accordance with one or more aspects. At 1002, a first node may receive an RxRUM, at a known PSD, from a second node. At 1004, the first node may calculate channel gain between itself and the second node based on the known PSD. At 1006, the first node may employ a transmission PSD associated with its own transmissions to estimate an amount of interference the first node may cause at the second node, based at least in part on the channel gain calculated at 1004. The interference estimate may be compared to a predetermined threshold value, at 1008, to determine whether the first node should transmit or refrain from transmitting. If the estimate is greater than the predetermined threshold, then the first node may refrain from transmitting (this could include either transmitting data or transmitting a request), at 1012. If the estimate is less than the predetermined threshold, then the first node may transmit, at 1010, because it does not substantially interfere with the second node. It will be appreciated that the RxRUM transmitted by the second node may be heard by multiple receiving nodes within a given proximity to the second node, each of which may perform method 1000 to evaluate whether not it should transmit.

According to another example, a second node may transmit at, for instance, 200 milliwatts, and a first node may transmit at 2 Watts. In such a case, the second node may have a transmission radius of r, and the first node may have a transmission radius of 10r. Thus, the first node may be positioned up to 10 times further away from the second node than the second node typically transmits or receives, but may still be capable of interfering with the second node because of its higher transmission power. In such a case, the second node may boost its transmit PSD during RxRUM transmission to ensure that the first node receives the RxRUM. For example, the second node may transmit the RxRUM at a maximum allowable PSD, which may be predefined for a given network. The first node may then perform method 1000 and determine whether or not to transmit, as described above.

Figure 11:
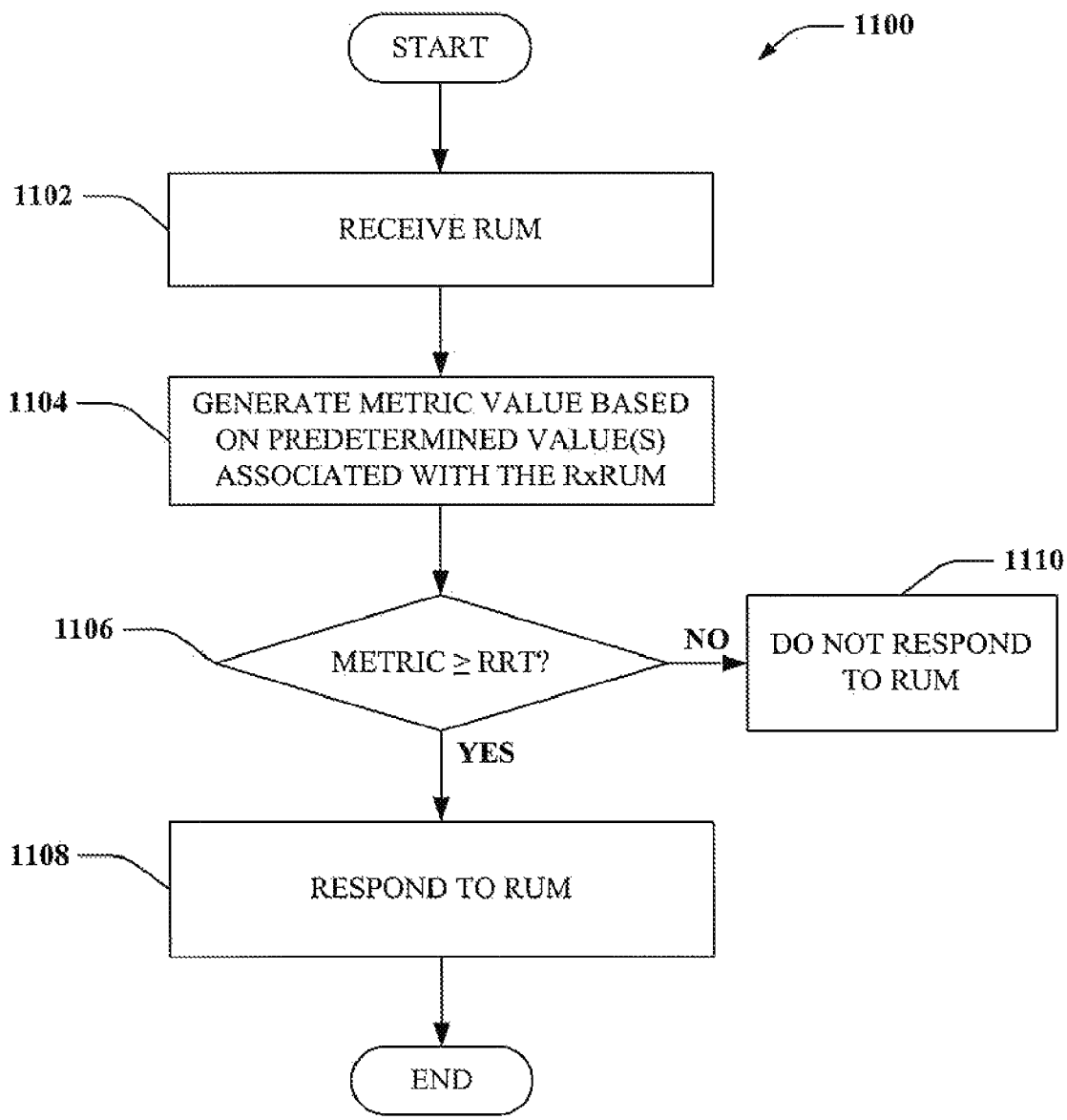
FIG. 11 illustrates a methodology for responding to interference control packets in a planned and/or ad hoc wireless communication environment, in accordance with various aspects.

FIG. 11 illustrates a methodology 1100 for responding to interference control packets in a planned and/or ad hoc wireless communication environment, in accordance with various aspects. At 1102, an RxRUM from a first node may be received at a second node. At 1104, a metric value may be generated based at least in part on predetermined values associated with the RUM. For instance, when a RUM is received at 1102, the receiving node (e.g., the second node) knows or may determine the RUM_Rx_PSD by estimating the RUM received power, RUM_Tx_PSD (a known constant of the system), and Data_Tx_PSD (the PSD at which the RUM receiving node would like to transmit its data). RUM_Tx_PSD and RUM_Rx_PSD are also quantified in dBm/Hz, where the former is a constant for all nodes and the latter depends on channel gain. Similarly, Data_Tx_PSD is measured in dBm/Hz and may be dependent on the power class associated with the node. The metric generated at 1104 may be expressed as:

$$\text{metric}=\text{Data\_}Tx\text{\_PSD}+(\text{RUM\_}Rx\text{\_PSD}-\text{RUM\_}Tx\text{\_PSD})$$

which represents an estimate of the possible interference that the RUM-transmitting node (e.g., for a TxRUM) or the RUM-receiving node (e.g., for an RxRUM) may cause at the other node.

At 1106, the metric value may be compared to a predetermined RUM rejection threshold (RRT) that is defined in dBm/Hz. If the metric is greater than or equal to RRT, then the second node may respond to the RUM at 1108. If the metric is less than RRT, then the second node may refrain from responding to the node (e.g., because it will not substantially interfere with the first node)), at 1100. The response to the RUM at 1108 may remove interference related to an interference-over-thermal (IOT) ratio that is greater than a predefined value, $\Omega$, which is measured in decibels, over thermal noise $N_0$, which is measured in dBm/Hz (e.g., such that the metric$\geq \Omega + N_0$). In order to assure that all substantial potential interferers are silent, RRT may be set such that RRT=$\Omega + N_0$. It is to be noted that the task of determining if the RRT threshold would be met or not is undertaken by the RxRUM receiving node only when the advertised weight on the RUM indicates that the RUM sender has a greater degree of disadvantage than the RUM recipient.

Figure 12:
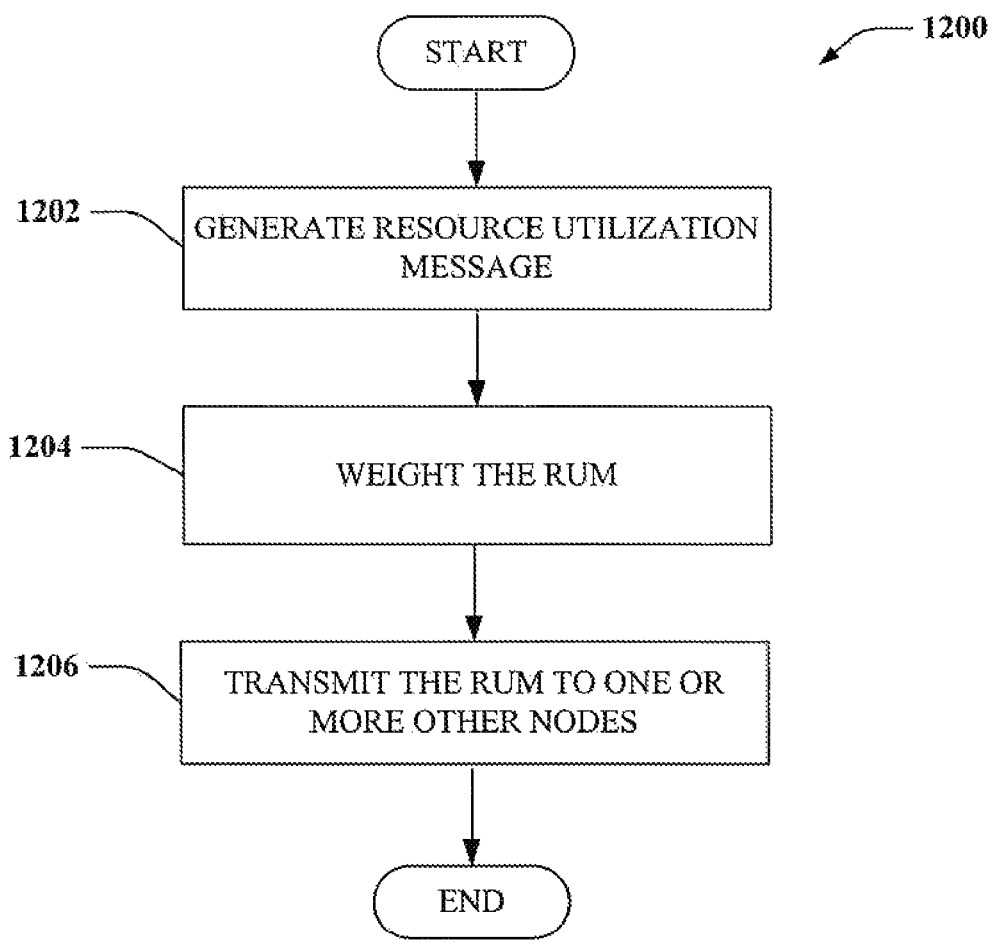
FIG. 12 is an illustration of a methodology for generating an RxRUM, in accordance with various aspects described above.

FIG. 12 is an illustration of a methodology 1200 that for generating an RxRUM, in accordance with various aspects described above. At 1202, a RUM may be generated at a first node, wherein the RUM comprises information that indicates that a first predetermined threshold has been met or exceeded. The first predetermined threshold may represent, for instance, a level of interference over thermal noise (IOT), a data rate, a carrier-to-interference ratio (C/I), a level of throughput, a level of spectral efficiency, a level of latency, or any other suitable measure by which a service at the first node may be measured. At 1204, the RUM may be weighted in order to indicate a degree to which a second predetermined threshold has been exceeded. According to some aspects, the weight value may be a quantized value.

The second predetermined threshold may represent for instance, a level of interference over thermal noise (IOT), a data rate, a carrier-to-interference ratio (C/I), a level of throughput, a level of spectral efficiency, a level of latency, or any other suitable measure by which a level of service at the first node may be measured. Although the first and second predetermined thresholds may be substantially equal, they need not be. Additionally, the first and second predetermined thresholds may be associated with different parameters (e.g.: IOT and C/I, respectively; latency and data rate, respectively; or any other permutation of the described parameters). At 1206, the weighted RUM may be transmitted to one or more other nodes.

Figure 13:
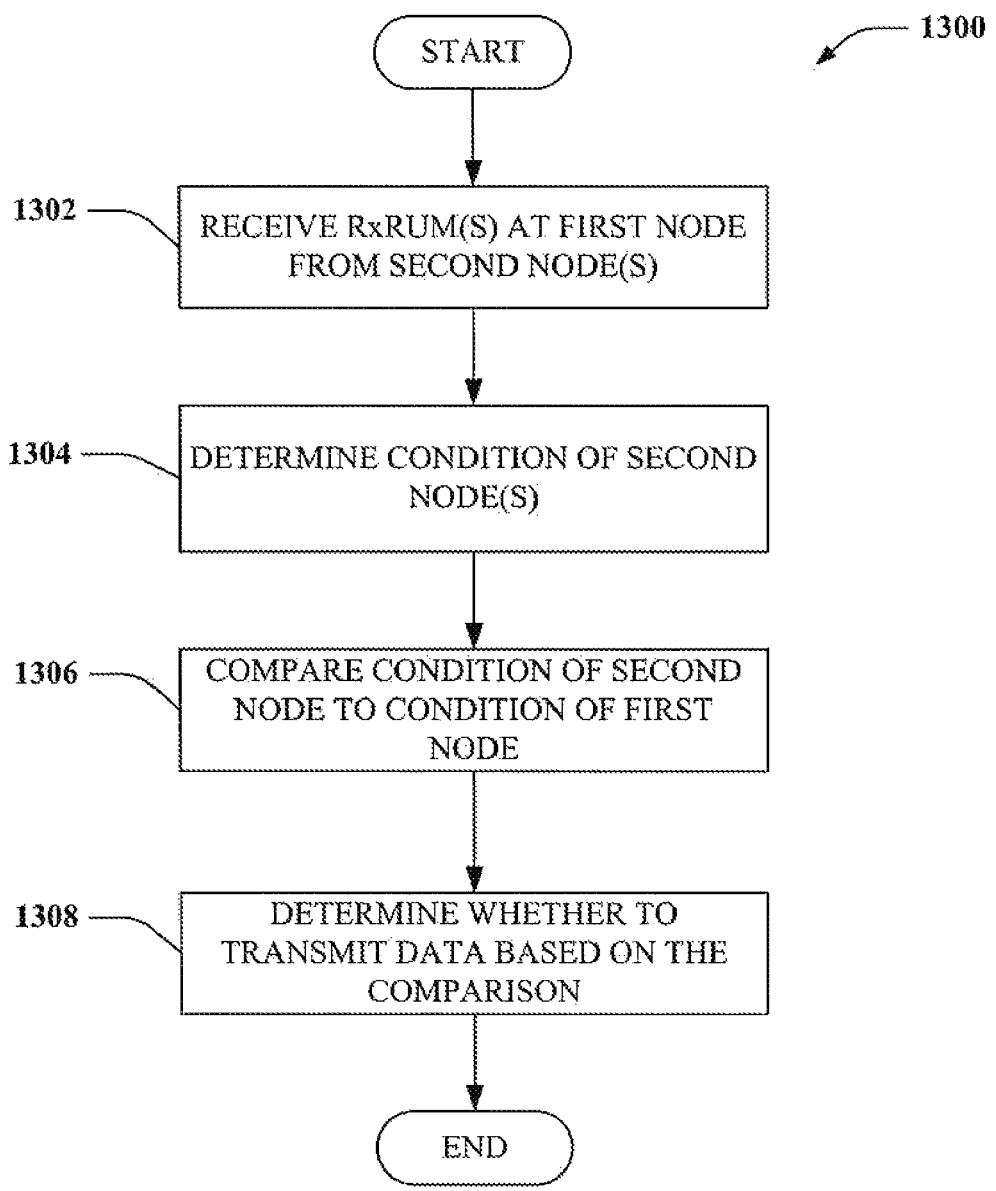
FIG. 13 is an illustration of a methodology for responding to one or more received RxRUMs, in accordance with one or more aspects.

FIG. 13 is an illustration of a methodology 1300 for responding to one or more received RxRUMs, in accordance with one or more aspects. At 1302, an RxRUM may be received at a first node from a second (or more) node(s). The RxRUM may comprise information related to a condition of the second node (e.g., a level of disadvantage, as described above), which may be utilized by the first node at 1304 to determine the condition of the second node. At 1306, the condition of the second node may be compared to the condition of the first node. The comparison may permit a determination of whether to transmit data, at 1308.

For instance, if the comparison indicates that the condition of the first node is better than that of the second node, then the first node may refrain from sending data (e.g., to back off and permit the more disadvantage second node to communicate more effectively). Additionally or alternatively, if the condition of the first node is better than that of the second node, the first node may proceed to determine a level of interference that the first node may cause at the second node, as described above with regard to FIG. 10. Such a determination may comprise, for instance, utilizing a known constant power or a known constant power spectral density at which the second node transmitted the RxRUM, estimating a channel gain between the first and second nodes, selecting a transmission power level for transmission from the first node to the second node, estimating a level of interference that a transmission at the selected power level would cause at the second node, and determining whether the estimated interference level exceeds a predetermined acceptable interference threshold level.

In the event that the comparison indicates that the first node's condition is worse than the second node's condition, the first node may select to ignore the RUM. According to another aspect, in the event that the first node and the second node have substantially equal conditions, a weight-handling mechanism may be employed, as described above with regard to FIG. 6. According to still other aspects, information contained in the RUM may be utilized to generate a metric value that may be compared to a RUM rejection threshold (RRT) to determine whether or not to respond to the RUM, as described with regard to FIG. 11. According to still other aspects, upon a determination to transmit data at 1308, such transmission may comprise sending communication data over a first channel, transmitting a request-to-send message over the first channel, and/or sending a request-to-send message over a second channel, which requests to send data over the first channel.

In another aspect, additional information may be included along with a request to help a scheduler know the outcome of RxRUM processing at the node. For example, suppose A transmits data to B and C to D. Suppose B and D both send out RxRUMs, but the weight used by B is higher (more disadvantaged) than D. Then, A would send a request to B (since it processed the received RxRUMs and concluded that its receiver, viz. B, is most disadvantaged) and include a "Best" bit indicating that it won contention and should be scheduled expeditiously as it may not keep winning in the future. By contrast, C would process the RUMs and conclude that it cannot request. However, it may let D know that even though it cannot be scheduled currently, it has data to send and D should persist in sending RxRUMs. For example, if D does not hear any requests, it may erroneously conclude that none of its transmitters have any data to send and may stop sending RxRUMs. To prevent this, C sends a "request" with an indication that it is "blocked" by RxRUMs from others. This will serve as an indication to D to not schedule C currently, but keep sending RxRUMs in the hope that C will win contention at some point.

Figure 14:
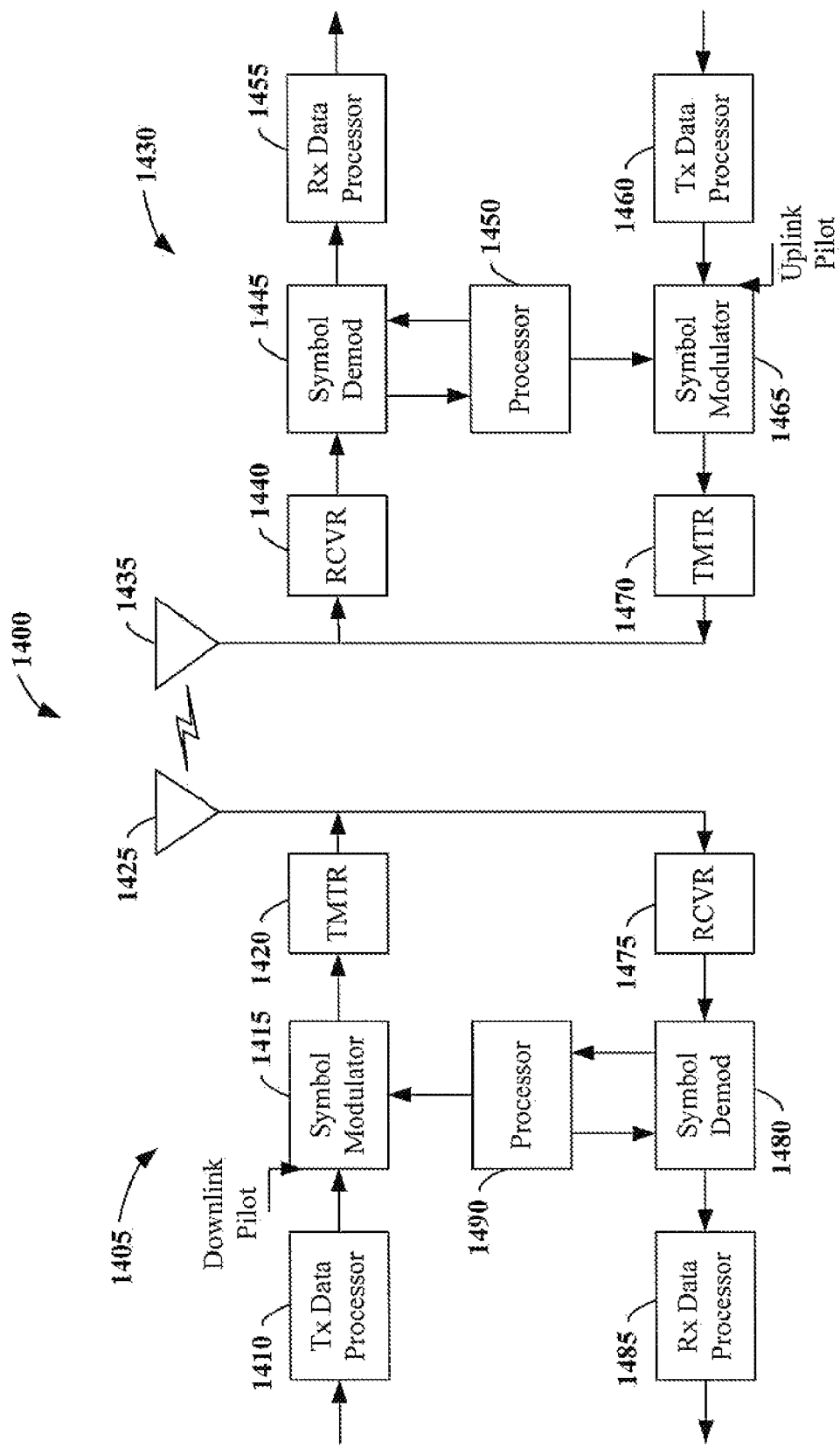
FIG. 14 is an illustration of a wireless network environment that can be employed in conjunction with the various systems and methods described herein.

FIG. 14 shows an exemplary wireless communication system 1400. The wireless communication system 1400 depict one base station and one terminal for sale of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the methods (FIGS. 2, 5-8, and 10-13) and/or systems (FIGS. 1, 3, 4, 9, and 15-18) described herein to facilitate wireless communication there between. For example, nodes in the system 1400 (e.g., base, station and/or terminal) may store and execute instructions for performing any of the above-described methods (e.g., generating RUMS, responding to RUMs, determining node disadvantage, selecting a number of subcarriers for RUM transmission, . . . ) as well as data associated with performing such actions and any other suitable actions for performing the various protocols described herein.

Referring now to FIG. 14, on a downlink, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. A symbol modulator 1420 multiplexes data and pilot symbols and provides them to a transmitter unit (TMTR) 1420. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1420 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1425 to the terminals. At terminal 1430, an antenna 1435 receives the downlink signal and provides a received signal to a receiver unit (RCVR) 1440. Receiver unit 1440 conditions (e.g., filters, amplifies, and frequency downconverts) the received signal and digitizes the conditioned signal to obtain samples. A symbol demodulator 1445 demodulates and provides received pilot symbols to a processor 1450 for channel estimation. Symbol demodulator 1445 further receives a frequency response estimate for file downlink from processor 1450, performs data demodulation on the received data symbols to obtain data symbol estimates (which are estimates of the transmitted data symbols), and provides the data symbol estimates to an RX data processor 1455, which demodulates (i.e., symbol demaps), deinterleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the uplinks, a TX data processor 1460 processes traffic data and provides data symbols. A symbol modulator 1465 receives and multiplexes the data symbols with pilot symbols, performs modulation, and provides a stream of symbols. A transmitter unit 1470 then receives and processes the stream of symbols to generate an uplink signal, which is transmitted by the antenna 1435 to the access point 1405.

At access point 1405, the uplink signal from terminal 1430 is received by the antenna 1425 and processed by a receiver unit 1475 to obtain samples. A symbol demodulator 1480 then processes the samples and provides received pilot symbols and data symbol estimates for the uplink. An RX data processor 1485 processes the data symbol estimates to recover the traffic data transmitted by terminal 1430. A processor 1490 performs channel estimation for each active terminal transmitting on the uplink. Multiple terminals may transmit pilot concurrently on the uplink on their respective assigned sets of pilot subbands, where the pilot subband sets may be interlaced.

Processors 1490 and 1450 direct (e.g., control, coordinate, manage, etc.) operation at access point 1405 and terminal 1430, respectively. Respective processors 1490 and 1450 can be associated with memory units (not shown) that store program codes and data. Processors 1490 and 1450 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through means (e.g., procedures, functions, and so on) that perform the functions described herein. The software codes may be stored in memory unit and executed by the processors 1490 and 1450.

For a software implementation, the techniques described herein may be implemented with modules/means (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Now turning to FIGS. 15-18, and to the various modules described with regard thereto, it will be appreciated that a module for transmitting may comprise, for example, a transmitter, and/or may be implemented in a processor, etc. Similarly, a module for receiving may comprise a receiver and/or may be implemented in a processor, etc. Additionally, a module for comparing, determining, calculating, and/or performing other analytical actions, may comprise a processor that executes instructions for performing the various and respective actions.

Figure 15:
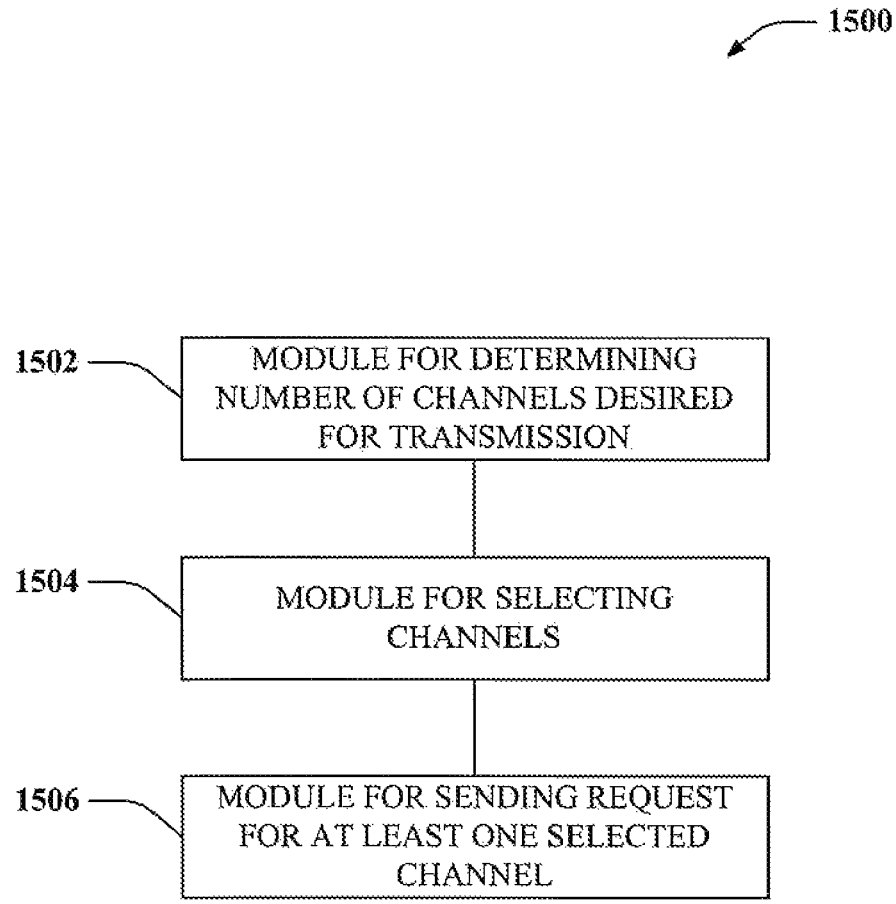
FIG. 15 is an illustration of an apparatus that facilitates wireless data communication, in accordance with various aspects.

FIG. 15 is an illustration of an apparatus 1500 that facilitates wireless data communication, in accordance with various aspects. Apparatus 1500 is represented as a series of interrelated functional blocks, which can represent functions implemented by a processor, software, or combination thereof (e.g., firmware). For example, apparatus 1500 may provide modules for performing various acts such as are described above with regard to various figures. Apparatus 1500 comprises a module for determining 1502 a number of channels desired for transmission. The determination may be performed as a function of a weight associated with a node in which the apparatus is employed, a weight associated with one or more other nodes, a number of channels available for transmission, etc. Additionally, each weight may be a function of a number of flows supported by the node associated with the weight. Additionally or alternatively, a given weight may be a function of interference experienced by the node.

Apparatus 1500 additionally comprise a module for selecting 1504 that selects channels for which the node may transmit a request. Module for selecting 1504 additionally may evaluate a received resource utilization message (RUM) to determine which channels are available and which are not. For instance, each RUM may comprise information associated with unavailable channels, and the module for selecting 1054 may determine that a given channel that is not indicated by the RUM is available. A module for sending 1506 may transmit a request for at least one channel selected by module for selecting 1504. It will be appreciated that apparatus 1500 may be employed in an access point an access terminal, etc., and may comprise any suitable functionality to carry out the various methods described herein.

Figure 16:
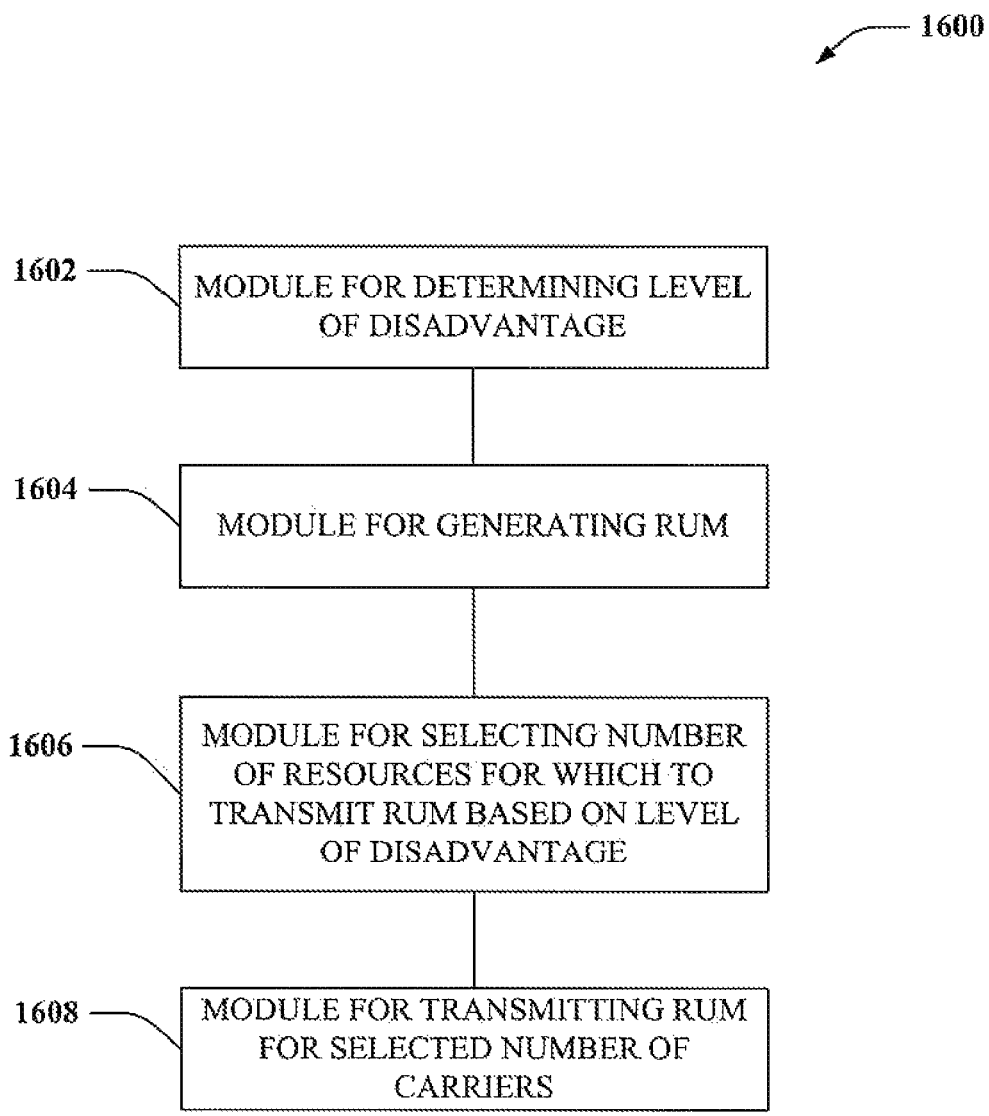
FIG. 16 is an illustration of an apparatus that facilitates wireless communication using resource utilization messages (RUMs), in accordance with one or more aspects.

FIG. 16 is an illustration of an apparatus 1600 that facilitates wireless communication using resource utilization messages (RUMs), in accordance with one or more aspects. Apparatus 1600 is represented as a series of interrelated functional blocks, which can represent functions implemented by a processor, software, or combination thereof (e.g., firmware). For example, apparatus 1600 may provide modules for performing various acts such as are described above with regard to previous figures. Apparatus 1600 comprises a module for determining 1602 that determines a level of disadvantage for a node, and a module for generating a RUM 1604 that generates a RUM if module for determining 1602 determines that a level or received service at the node is at or below a predetermined threshold level. A module for selecting 1606 may select one or more resources for which to send the RUM, and module for generating the RUM 1604 may then indicate such channels in the RUM. A module for transmitting 1608 may then transmit the RUM.

Module for selecting resources 1606 may adjust a number of selected resources for which subsequent a subsequent RUM is transmitted based on a determination by module for determining 1602 that the level of received service has improved in response to a previous RUM. For instance, in such a scenario, module for selecting 1606 may reduce a number of resources indicated in a subsequent RUM in response to an improved level of received service at the node, and may increase a number of selected resources in response to a decreased or static level of received service. According to other aspects, module for determining 1602 may determine the level of received service at the node as a function of one or more of interference-over-thermal noise, latency, data rate achieved at the node, spectral efficiency, throughput, carrier-to-interference ratio, or any other suitable parameter of service received at the node. It will be appreciated that apparatus 1600 may be employed in an access point, an access terminal, etc., and may comprise any suitable functionality to carry out the various methods described herein.

Figure 17:
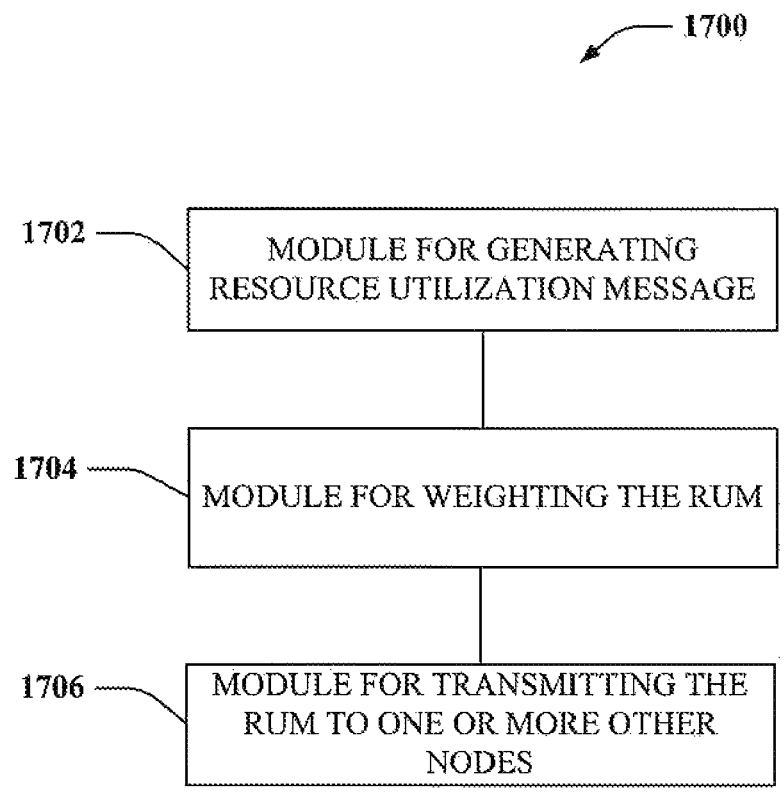
FIG. 17 is an illustration of an apparatus that facilitates generating a resource utilization message (RUM) and weighting the RUM to indicate a level of disadvantage, in accordance with various aspects.

FIG. 17 is an illustration of an apparatus 1700 that facilitates generating a resource utilization message (RUM) and weighting the RUM to indicate a level of disadvantage, in accordance with various aspects. Apparatus 1700 is represented as a series of interrelated functional blocks, which can represent functions implemented by a processor, software, or combination thereof (e.g., firmware). For example, apparatus 1700 may provide modules for performing various acts such as are described above with regard to various figures described above. Apparatus 1700 comprises module for generating a RUM 1702, which may generate a RUM that indicates that a first predetermined threshold has been exceeded. The first predetermined threshold may be associated with and/or represent a threshold level of interference over thermal noise (IOT), a data rate, a carrier-to-interference ratio (C/I), a level of throughput, a level of spectral efficiency, a level of latency, etc.

Apparatus 1700 may additionally comprise a module for weighting the RUM 1704, which may weight the RUM with a value indicative of a degree to which a second predetermined threshold has been exceeded, which may comprise determining a ration of an actual value of a parameter (e.g., interference over thermal noise (IOT), a data rate, a carrier-to-interference ratio (C/I), a level of throughput, a level of spectral efficiency, a level of latency, etc.) achieved at the node to a target, or desired, value. Additionally, the weighted value may be a quantized value. It will be appreciated that apparatus 1700 may be employed in an access point, an access terminal, etc., and may comprise any suitable functionality to carry out the various methods described herein.

Figure 18:
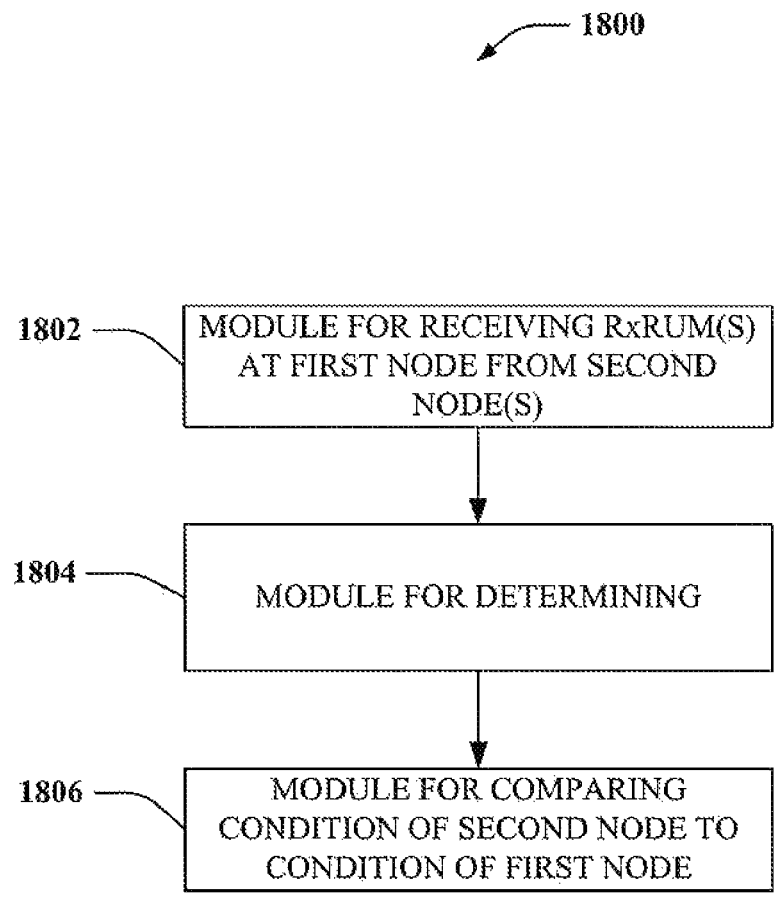
FIG. 18 is an illustration of an apparatus that facilitates comparing relative conditions at nodes in a wireless communication environment to determine which nodes are most disadvantaged, in accordance with one or more aspects.

FIG. 18 is an illustration of an apparatus 1800 that facilitates comparing relative conditions at nodes in a wireless communication environment to determine which nodes are most disadvantaged, in accordance with one or more aspects. Apparatus 1800 is represented as a series of interrelated functional blocks, which can represent functions implemented by a processor, software, or combination thereof (e.g., firmware). For example, apparatus 1800 may provide modules for performing various acts such as are described above with regard to various figures. Apparatus 1800 may be employed in a first node and comprises a module for receiving RUMs 1802 that receives RUMs from at least one second node. Apparatus 1800 may additionally comprise a module for determining 1804 that determines a condition of the second node based on information associated with a RUM received from the second node, and a module for comparing 1806 that compares a condition of the first node to the determined condition of the second node. The module for determining 1804 may then further determine whether to transmit data over a first channel based on the comparison.

According to various other aspects, the determination of whether to transmit may be based on whether the first node's condition is better, substantially equal to, or worse than the second node's condition. Additionally, the module for determining 1804 may transmit a data signal over the first channel, a request-to-send message over the first channel, or a request-to-send message over a second channel. In the latter case, the request-to send message sent over the second channel may comprise a request to transmit data over the first channel. It will be appreciated that apparatus 1800 may be employed in an access point, an access terminal, etc., and may comprise any suitable functionality to carry out the various methods described herein.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of wireless communication, comprising:
   receiving service at an apparatus;
   determining, by the apparatus, a level of the received service at the apparatus;
   determining a level of disadvantage for the apparatus as a function of the level of service;
   generating a resource utilization message (RUM) if the level of disadvantage for the apparatus is unacceptable;
   selecting a number of one or more resources for which to transmit the RUM;
   transmitting, by the apparatus, the RUM for the selected one or more resources, wherein the RUM indicates to at least one node receiving the RUM to reduce interference on the selected one or more resources;
   generating a subsequent RUM in response to an increase in the level of received service;
   reducing the number of the one or more resources for which to transmit the subsequent RUM; and
   transmitting the subsequent RUM for the reduced one or more resources.

2. The method of claim 1, further comprising increasing the number of the one or more resources for which another subsequent RUM is sent in response to a decrease or stasis of the level of received service.

3. The method of claim 1, further comprising predefining an upper limit for the number of the one or more resources selected for transmission of the RUM.

4. The method of claim 3, wherein the upper limit is a function of apparatus type.

5. The method of claim 3, wherein the upper limit is a function of desired service level.

6. The method of claim 3, wherein the upper limit is a function of number of flows through the apparatus.

7. The method of claim 1, wherein the level of received service at the apparatus is a function of a level of interference over thermal noise (JOT) experienced at the apparatus.

8. The method of claim 1, wherein the level of received service at the apparatus is a function of a level of data rate achieved at the apparatus.

9. The method of claim 1, wherein the level of received service at the apparatus is a function of a level of carrier-to-interference ratio (C/I) experienced at the apparatus.

10. The method of claim 1, wherein the level of received service at the apparatus is a function of a level of throughput achieved at the apparatus.

11. The method of claim 1, wherein the level of received service at the apparatus is a function of a level of spectral efficiency achieved at the apparatus.

12. The method of claim 1, wherein the level of received service at the apparatus is a function of a level of latency experienced by the apparatus.

13. The method of claim 1, wherein the apparatus comprises an access point.

14. The method of claim 1, wherein the apparatus comprises an access terminal.

15. An apparatus that facilitates wireless communication, comprising:
   a receiving module that receives service;
   a determining module that determines a level of the received service at the apparatus and determines a level of disadvantage for the apparatus as a function of the level of service;
   a generating module that generates a resource utilization message (RUM) if the level of disadvantage for the apparatus is unacceptable and generates a subsequent RUM in response to an increase of the level of received service;
   a selecting module that selects a number of one or more resources for which to transmit the RUM and reduces the number of the one or more resource for which to transmit the subsequent RUM; and
   a transmitting module that transmits the RUM for the selected one or more resources, wherein the RUM indicates to at least one node receiving the RUM to reduce interference on the selected one or more resources, and transmits the subsequent RUM for the reduced one or more resources.

16. The apparatus of claim 15, wherein the selecting module increases the number of the one or more resources for which another subsequent RUM is sent in response to a decrease or stasis of the level of received service.

17. The apparatus of claim 15, further comprising a predefined upper limit for the number of the one or more resources selected for transmission of the RUM.

18. The apparatus of claim 17, wherein the upper limit is a function of apparatus type.

19. The apparatus of claim 17, wherein the upper limit is a function of desired service level.

20. The apparatus of claim 17, wherein the upper limit is a function of number of flows through the apparatus.

21. The apparatus of claim 15, wherein the level of received service at the apparatus is a function of at least one of a level of interference over thermal noise (IOT) experienced at the apparatus, a level of data rate achieved at the apparatus, a level of a carrier-to-interference ratio (C/I) experienced at the apparatus, a level of throughput achieved at the apparatus, a level of spectral efficiency achieved at the apparatus, and a level of latency experienced by the apparatus.

22. An apparatus that facilitates wireless communication, comprising:
   means for receiving service at an apparatus;
   means for determining a level of the received service at the apparatus;
   means for determining a level of disadvantage for the apparatus as a function of the level of service;
   means for generating a resource utilization message (RUM) if the level of disadvantage for the apparatus is unacceptable;
   means for selecting a number of one or more resources for which to transmit the RUM;
   means for transmitting the RUM for the selected one or more resources, wherein the RUM indicates to at least one node receiving the RUM to reduce interference on the selected one or more resources;
   means for generating a subsequent RUM in response to an increase in the level of received service;
   means for reducing the number of the one or more resources for which to transmit the subsequent RUM; and means for transmitting the subsequent RUM for the reduced one or more resources.

23. The apparatus of claim 22 further comprising means for increasing the number of the one or more resources for which another subsequent RUM is sent in response to a decrease or stasis of the level of received service.

24. The apparatus of claim 22, further comprising a predefined upper limit for the number of the one or more resources selected for transmission of the RUM.

25. The apparatus of claim 24, wherein the upper limit is a function of apparatus type.

26. The apparatus of claim 24, wherein the upper limit is a function of desired service level.

27. The apparatus of claim 24, wherein the upper limit is a function of number of flows through the apparatus.

28. The apparatus of claim 22, wherein the level of received service at the apparatus is a function of at least one of a level of interference over thermal noise (IOT) experienced at the apparatus, a level of data rate achieved at the apparatus, a level of a carrier-to-interference ratio (C/I) experienced at the apparatus, a level of throughput achieved at the apparatus, a level of spectral efficiency achieved at the apparatus, and a level of latency experienced by the apparatus.

29. A computer-readable storage device comprising code executable to:
receive service at an apparatus;
determine, by the apparatus, a level of the received service at the apparatus;
determine a level of disadvantage for the apparatus as a function of the level of service;
generate a resource utilization message (RUM) if the level of disadvantage for the apparatus is unacceptable;
select a number of one or more resources for which to transmit the RUM;
transmit the RUM for the selected one or more resources, wherein the RUM indicates to at least one node receiving the RUM to reduce interference on the selected one or more resources;
generate a subsequent RUM in response to an increase in the level of received service;
reduce the number of the one or more resources for which to transmit the subsequent RUM; and
transmit the subsequent RUM for the reduced one or more resources.

30. A wireless node, comprising:
an antenna;
a receiving module that receives service;
a determining module that determines a level of the received service at the wireless node and determines a level of disadvantage for the wireless node as a function of the level of service;
a generating module that generates a resource utilization message (RUM) if the level of disadvantage for the wireless node is unacceptable and generates a subsequent RUM in response to an increase of the level of received service;
a selecting module that selects a number of one or more resources for which to transmit the RUM and reduces the number of the one or more resource for which to transmit the subsequent RUM; and
a transmitting module that transmits the RUM for the selected one or more resources, wherein the RUM indicates to at least one other node receiving the RUM to reduce interference on the selected one or more resources, and transmits the subsequent RUM for the reduced one or more resources via the antenna.

31. The method of claim 1, wherein the one or more resources comprises one or more channels.

32. The apparatus of claim 15, wherein the one or more resources comprises one or more channels.

33. The apparatus of claim 22, wherein the one or more resources comprises one or more channels.

34. The method of claim 31, wherein the RUM identifies the one or more channels.

35. The apparatus of claim 32, wherein the RUM identifies the one or more channels.

36. The apparatus of claim 33, wherein the RUM identifies the one or more channels.

37. The method of claim 1, wherein the selection of the number of one or more resources is based on the level of disadvantage.

38. The method of claim 1, wherein the RUM comprises a weight that indicates the level of disadvantage.

* * * * *